US012585680B2

(12) United States Patent
Avny Brosh et al.

(10) Patent No.: US 12,585,680 B2
(45) Date of Patent: Mar. 24, 2026

(54) CONTEXTUAL TITLES BASED ON TEMPORAL PROXIMITY AND SHARED TOPICS OF RELATED COMMUNICATION ITEMS WITH SENSITIVITY POLICY

(71) Applicant: MICROSOFT TECHNOLOGY LICENSING, LLC, Redmond, WA (US)

(72) Inventors: Tzoof Avny Brosh, Herzliya (IL); Dikla Dotan-Cohen, Netanya (IL); Eyal Menahem Kolman, Raanana (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 252 days.

(21) Appl. No.: 18/336,831

(22) Filed: Jun. 16, 2023

(65) Prior Publication Data

US 2024/0419699 A1     Dec. 19, 2024

(51) Int. Cl.
  *G06F 40/30*        (2020.01)
  *G06F 16/3329*      (2025.01)
       (Continued)

(52) U.S. Cl.
  CPC ........ *G06F 16/3329* (2019.01); *G06F 40/284* (2020.01)

(58) Field of Classification Search
  CPC .... G06F 16/383; G06F 40/279; G06F 40/295; G06F 40/30
       (Continued)

(56) References Cited

U.S. PATENT DOCUMENTS 7,177,909 B2 *  2/2007  Stark .................... G06Q 10/107
                                                       709/225
9,705,832 B2    7/2017  Waltermann et al.
       (Continued)

FOREIGN PATENT DOCUMENTS

EP          2704038 A1 *  3/2014  ............. G06F 16/58

OTHER PUBLICATIONS

Ortiz, et al., "How to save a ChatGPT conversation to revisit later", Retrieved from: https://www.zdnet.com/article/how-to-save-a-chatgpt-conversation/, Mar. 7, 2023, 17 Pages.

*Primary Examiner* — Martin Lerner
(74) *Attorney, Agent, or Firm* — Shook, Hardy & Bacon L.L.P.

(57)            ABSTRACT

Technology is disclosed to programmatically determine and generate, for a target communication item, a contextual title that is relevant to a user, optimally formatted for ease of indexing and use by certain software applications, and easy for the user to consume. The contextual title is generated based on a comparison of the target communication item and related communication items. In this manner, the contextual title generated for the target communication item is different from existing contextual titles of the related communication items, yet related enough to associate the target communication item to certain related communication items. In this manner, contextual titles are generated without a user having to open or edit metadata associated with the communication item, thereby conserving bandwidth associated with a user engaging with high-bandwidth content from the target communication item and battery associated with consuming and editing the document.

10 Claims, 12 Drawing Sheets

(51) Int. Cl.
    *G06F 40/279*     (2020.01)
    *G06F 40/284*     (2020.01)
    *G06F 40/295*     (2020.01)

(58) Field of Classification Search
    USPC ..................................... 704/1, 8, 9; 705/2, 3
    See application file for complete search history.

(56) References Cited

U.S. PATENT DOCUMENTS

| | | | |
|---|---|---|---|
| 10,489,462 B1 * | 11/2019 | Rogynskyy | G06F 16/28 |
| 10,642,830 B2 | 5/2020 | Millius et al. | |
| 10,897,432 B2 | 1/2021 | Estrada et al. | |
| 11,394,674 B2 | 7/2022 | Borenstein et al. | |
| 11,418,471 B2 | 8/2022 | Milligan et al. | |
| 11,580,350 B2 | 2/2023 | Wu | |
| 12,154,555 B2 * | 11/2024 | Gustof | G06F 40/30 |
| 2007/0005649 A1 * | 1/2007 | Wang | G06F 16/957 |
| 2014/0122619 A1 | 5/2014 | Duan | |
| 2017/0270180 A1 * | 9/2017 | State | G06F 40/169 |
| 2019/0213498 A1 | 7/2019 | Adjaoute | |
| 2021/0133557 A1 * | 5/2021 | Iyoob | G06F 40/205 |
| 2023/0011793 A1 * | 1/2023 | Chandrashekar | G06F 40/30 |
| 2023/0326454 A1 * | 10/2023 | Miller-Smith | G06F 40/295 |
| | | | 704/235 |
| 2023/0394854 A1 * | 12/2023 | Polavaram | G06F 40/253 |
| 2024/0104055 A1 * | 3/2024 | McAnallen | G06F 16/164 |

\* cited by examiner

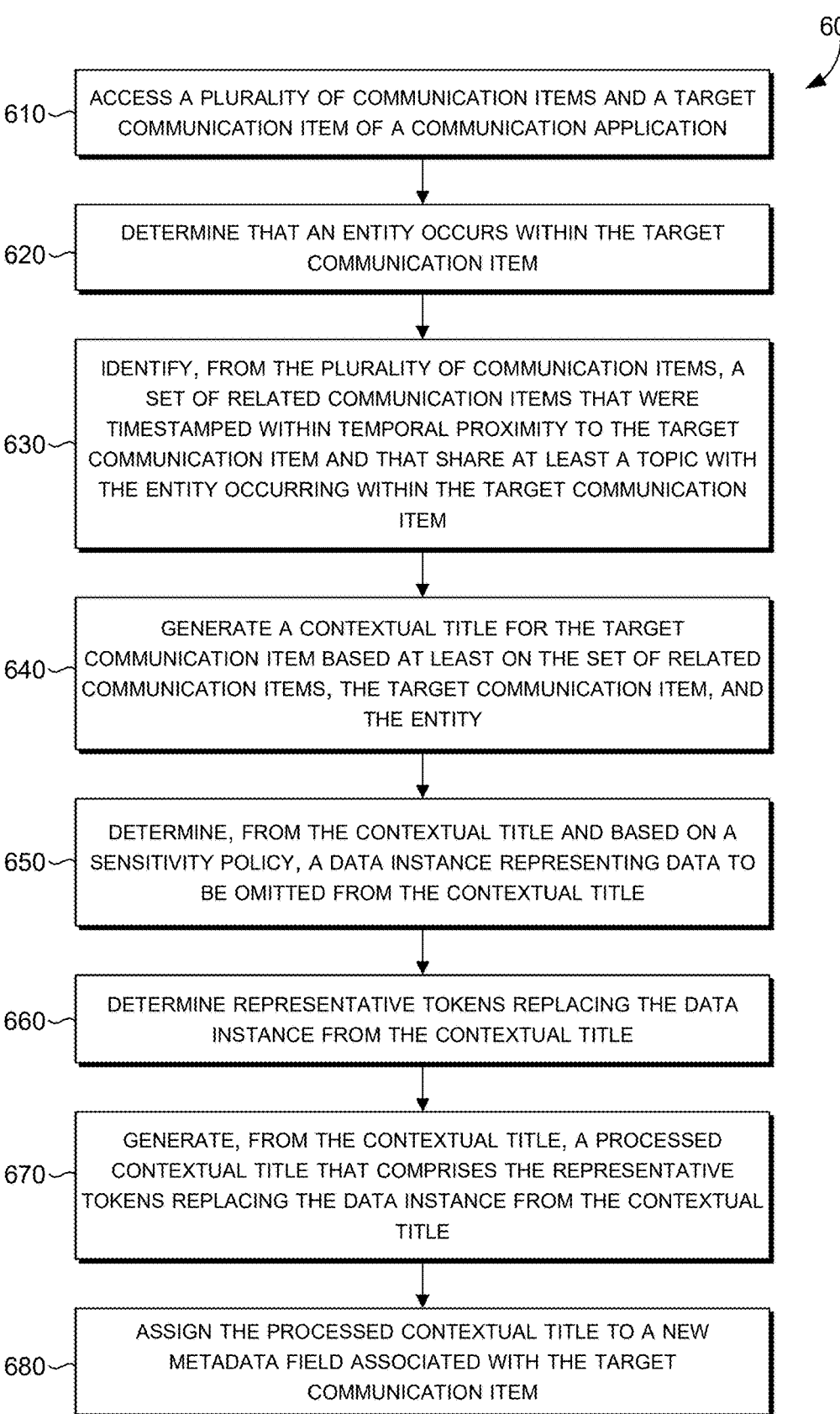

600

610 — ACCESS A PLURALITY OF COMMUNICATION ITEMS AND A TARGET COMMUNICATION ITEM OF A COMMUNICATION APPLICATION

620 — DETERMINE THAT AN ENTITY OCCURS WITHIN THE TARGET COMMUNICATION ITEM

630 — IDENTIFY, FROM THE PLURALITY OF COMMUNICATION ITEMS, A SET OF RELATED COMMUNICATION ITEMS THAT WERE TIMESTAMPED WITHIN TEMPORAL PROXIMITY TO THE TARGET COMMUNICATION ITEM AND THAT SHARE AT LEAST A TOPIC WITH THE ENTITY OCCURRING WITHIN THE TARGET COMMUNICATION ITEM

640 — GENERATE A CONTEXTUAL TITLE FOR THE TARGET COMMUNICATION ITEM BASED AT LEAST ON THE SET OF RELATED COMMUNICATION ITEMS, THE TARGET COMMUNICATION ITEM, AND THE ENTITY

650 — DETERMINE, FROM THE CONTEXTUAL TITLE AND BASED ON A SENSITIVITY POLICY, A DATA INSTANCE REPRESENTING DATA TO BE OMITTED FROM THE CONTEXTUAL TITLE

660 — DETERMINE REPRESENTATIVE TOKENS REPLACING THE DATA INSTANCE FROM THE CONTEXTUAL TITLE

670 — GENERATE, FROM THE CONTEXTUAL TITLE, A PROCESSED CONTEXTUAL TITLE THAT COMPRISES THE REPRESENTATIVE TOKENS REPLACING THE DATA INSTANCE FROM THE CONTEXTUAL TITLE

680 — ASSIGN THE PROCESSED CONTEXTUAL TITLE TO A NEW METADATA FIELD ASSOCIATED WITH THE TARGET COMMUNICATION ITEM

FIG. 6

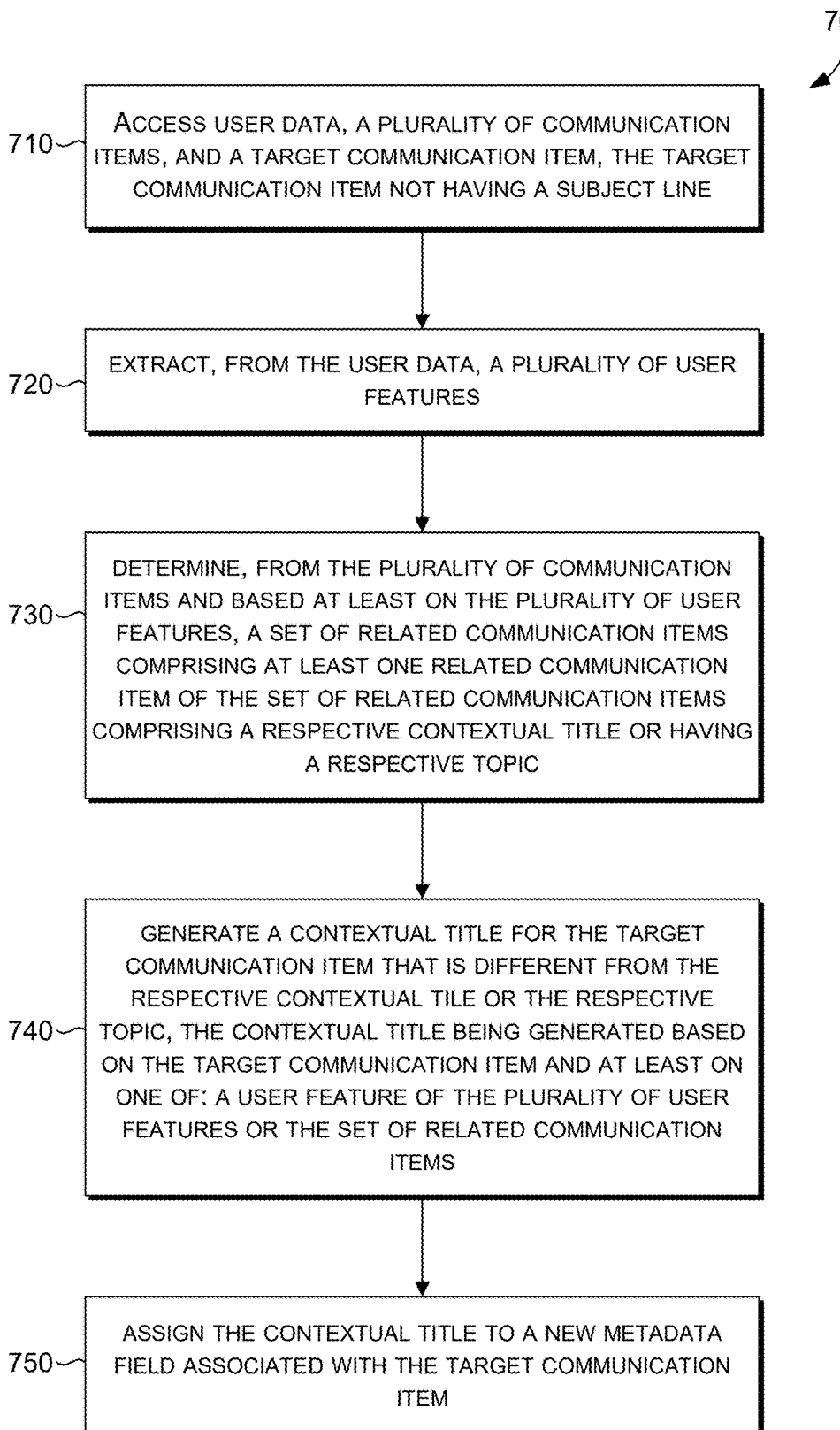

700

710 — ACCESS USER DATA, A PLURALITY OF COMMUNICATION ITEMS, AND A TARGET COMMUNICATION ITEM, THE TARGET COMMUNICATION ITEM NOT HAVING A SUBJECT LINE

720 — EXTRACT, FROM THE USER DATA, A PLURALITY OF USER FEATURES

730 — DETERMINE, FROM THE PLURALITY OF COMMUNICATION ITEMS AND BASED AT LEAST ON THE PLURALITY OF USER FEATURES, A SET OF RELATED COMMUNICATION ITEMS COMPRISING AT LEAST ONE RELATED COMMUNICATION ITEM OF THE SET OF RELATED COMMUNICATION ITEMS COMPRISING A RESPECTIVE CONTEXTUAL TITLE OR HAVING A RESPECTIVE TOPIC

740 — GENERATE A CONTEXTUAL TITLE FOR THE TARGET COMMUNICATION ITEM THAT IS DIFFERENT FROM THE RESPECTIVE CONTEXTUAL TILE OR THE RESPECTIVE TOPIC, THE CONTEXTUAL TITLE BEING GENERATED BASED ON THE TARGET COMMUNICATION ITEM AND AT LEAST ON ONE OF: A USER FEATURE OF THE PLURALITY OF USER FEATURES OR THE SET OF RELATED COMMUNICATION ITEMS

750 — ASSIGN THE CONTEXTUAL TITLE TO A NEW METADATA FIELD ASSOCIATED WITH THE TARGET COMMUNICATION ITEM

FIG. 7

CONTEXTUAL TITLES BASED ON TEMPORAL PROXIMITY AND SHARED TOPICS OF RELATED COMMUNICATION ITEMS WITH SENSITIVITY POLICY

BACKGROUND

As the number of tasks, meetings, electronic communications, documents, and other content an individual manages continues to increase, it becomes more difficult to stay on top of events, commitments, projects, and so much more. Users today have many meetings, deadlines, work tasks, and so forth and increasingly rely on various chat or messaging services to communicate and keep on top of commitments and schedules. A communication service, such as a video streaming service, can be a useful tool for helping users communicate and distribute information in a near real-time manner, but often communication items, such as chats, video, and other content or forms of media communicated over the communication service are lengthy, cover a large number of topics, and fail to be indexed in an easily searchable manner. At most, certain communication items, such as video records, can be saved and indexed with a title that includes the date and time of the recording.

SUMMARY

This summary is provided to introduce a selection of concepts in a simplified form that is further described below in the detailed description. This summary is not intended to identify key features or essential features of the claimed subject matter, nor is it intended to be used in isolation as an aid in determining the scope of the claimed subject matter.

Embodiments described in the present disclosure are directed toward technologies for automatically determining and generating, for a target communication item, a contextual title (also referred to herein, in one example, as a "chat title") that is relevant to a user, optimally formatted for ease of indexing and use by certain software applications, and easy for the user to consume. In one example, a "contextual title" includes any suitable string of alphanumeric characters that serve as short summaries of sections of the communication item. As described herein, certain contextual titles provide context for various functions and services, such as language model-driven applications (such as MICROSOFT® Copilot), task tracking, indexing for ease of storage and retrieval, and integration with productivity applications (such as electronic calendars and web-based applications). In the context of language model-driven applications, embodiments described in the present disclosure rank communication items based on relevance of the contextualized titles so that content from the most relevant communication items are included in prompts, thereby increasing efficiency of large language model utilization. In one embodiment, a contextual title is determined from a context of a plurality of communication items in regards to a target communication item. For example, a set of communication items that are related to a target communication item are determined based on relevance, relatedness, and other factors. Continuing this example, occurrence of an entity in the target communication item is determined from the set of communication items that were accessed (or that have a time stamp from) prior to the target communication item.

Additionally, in some embodiments, scenarios likely to result in redundant information and unnecessary memory storage usage are determined and handled so that the utility of the contextual title is assessed and stored if the contextual title adds context to the target communication item. In one embodiment, a contextual title of a target communication item is analyzed to verify that the contextual title provides additional context to the target communication item. In this example, the contextual title is compared to an entity occurring within the communication to determine if the entity also appears in the contextual title; if the entity does not indicate the contextual title, then the contextual title is verified and saved.

Additionally, in some embodiments, scenarios likely to cause an error are determined and handled so that the accuracy of the generated contextual title is increased. In one embodiment, the accuracy of the contextual title is assessed by checking whether words in the contextual title appear in the set of related communication items or in the target communication item. Additionally, a coherence of certain generated contextual titles is determined.

Such technologies improve the user experience in any of a number of computer applications and platforms. For example, user engagement and productivity can increase through the personalized or contextualized content contained in the contextual title. Certain contextual titles improve the functionality of certain applications by providing additional context to certain applications employing large language models. Further, these technologies reduce computational resources and bandwidth associated with a larger volume of content being generated and communicated to the user for presentation, especially during times of high user computer traffic. For example, certain contextual titles are only stored or generated when their accuracy, utility, or lack of redundancy is verified. Moreover, embodiments disclosed herein support on-demand download of these contextual titles. In one example, the contextual titles are generated during times with lower user activity and less computational resource consumption, thereby reducing impact to other services or technologies.

BRIEF DESCRIPTION OF THE DRAWINGS

Aspects of the disclosure are described in detail below with reference to the attached drawing figures, wherein:

FIG. 6 depicts a flow diagram of a method for generating, for a target communication item, a processed contextual title that is assigned to a new metadata field of the target communication item, in accordance with an embodiment of the present disclosure;

FIG. 7 depicts a flow diagram of a method for generating, for a target communication item, a contextual title that is assigned to a new metadata field of the target communication item, in accordance with an embodiment of the present disclosure;

DETAILED DESCRIPTION

Figure 1:
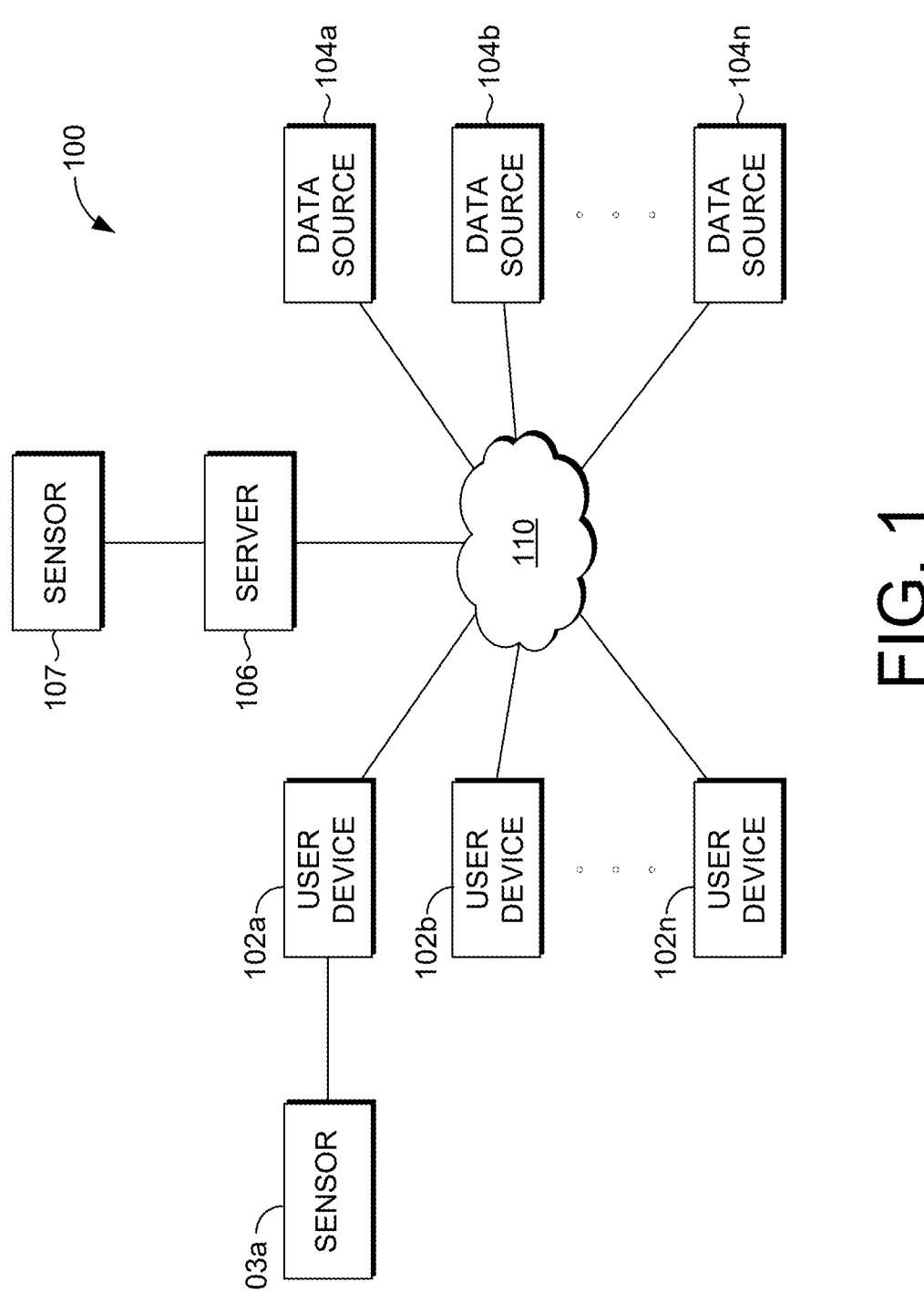
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. The method(s) described herein may comprise a computing process performed using any combination of hardware, firmware, and/ or software. For example, various functions are carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Certain communication, video, and messaging services are useful tools to provide users with a platform to communicate with colleagues, co-workers, focus groups, classmates, and other people or virtual assistants. To improve upon this technical field, embodiments of the present disclosure relate to, among other things, technical improvements to electronic communication technology and enhanced computing services to automatically generate a contextual title (also referred to herein, in one example, as a "contextual chat title" or a "processed contextual title") that is relevant to a user (for example, personalized to the user), that is enhanced with metadata to improve the efficiency of search and storage, and that is easy for the user to consume.

Although certain embodiments are discussed in the context of a contextual title that includes alphanumeric characters or other text providing additional context, it should be understood that the contextual title is not limited to a title of contextual text. For example, certain embodiments of the contextual title additionally or alternatively include script, an image, an annotation, a color-coded mark, and the like. Accordingly, certain embodiments disclosed herein facilitate determining contextual titles for communication items that otherwise do not have context in their titles, for example, other than the time or date during which the communication item was communicated. Further, certain embodiments disclosed herein leverage previously generated contextual titles for other communication items to ensure that the newly generated contextual title is unique enough to avoid confusion with previously generated contextual titles, while at the same time associating the communication to related communication items, for example, based on their respective contextual titles. In this manner, previously generated contextual titles can be utilized to recursively determine, generate, and store new contextual titles, thereby reducing computational resources associated with determining and generating the contextual title.

Certain communication items, for example those without a subject line, such as raw Short Messaging Service (SMS) conversation/text threads, videos, video transcripts, chat conversations or photos are not processed and stored for efficient search and retrieval of information contained in these communication items. At most, certain existing communication services (for example, video or meeting services) generate a particular file type that includes a file title indicative of a time during which the meeting was conducted. For example, an automatically generated file title is "2023 May 28 WEB MEETING.mp4." Such a title generally provides a date during which the meeting was held (in this example "2023 May 28"), or other low-level data, such as the title of the meeting (in this example, "WEB MEETING") or the file format (in this example, ".mp4"). This file name provides little insight into the context of the communication item, making searching a communication service for a particular piece of content within the communication item a difficult or nearly impossible task that may instead require tedious, manual intervention. Further still, rather than providing a helpful, quick-to-read contextual title, certain existing communication items have similar names, such as when meetings are conducted on the same day. For example, two conventional meeting recordings conducted on the same date of May 28, 2023 can be titled and saved as "2023 May 28 WEB MEETING-1.mp4" and "2023 May 28 WEB MEETING-2.mp4," respectively, with only the "1" or "2" at the end of the title distinguishing between the two meeting recordings. Distinguishing between meeting recordings and quickly searching for relevant information contained in these meeting recordings becomes difficult and inefficient. To make use of these communication items, a user generally opens and carefully listens to the recording or reads the meeting transcript to manually extract the value from it. Accordingly, certain existing briefing messages provide more work for a user instead of serving as a tool to improve efficiency.

To address these limitations, certain solutions provided herein include technologies to programmatically generate, for a target communication item, a contextual title that is different from an existing contextual title for another communication item or that shares an entity with a topic of a set of related communication items. Indeed, certain solutions programmatically generate a contextual title that is relevant to a user (for example, personalized to the user), that is enhanced with metadata to improve the efficiency of search and storage, and that is easier for the user to consume.

In one example, a "communication item" refers to a discrete packaging of data assembled from a user profile and/or communication item data accessible via a communication service. Example communication items include a message transcript, a video recording or corresponding transcript, voice mail, an audio recording or corresponding transcript, a photo (that includes text), email, an instant message or chat or a chat session, a social media post, and the like. In one example, the communication item is managed by a communications software application, a messaging software application, a video streaming software application, a meeting streaming application, and the like. Example applications or services include MICROSOFT® VIVA, MICROSOFT® TEAMS, SKYPE®, YOUTUBE®, ZOOM®, and the like. In one example, the message transcript can include a chat conversation that includes one or more messages between any number of people or virtual assistants. In one example, a larger communication item, such as a conversation session, can be broken down into smaller communication items, such as segments of the conversation session. Accordingly, "communication item" is not limited to an entire packaging of data, such as an entire conversation session, and can instead refer to smaller portions, such as a segment of the conversation session, for example.

In one example, a "target communication item" refers to a communication item for which a contextual title is generated based on the embodiments disclosed herein. For example, in one embodiment, a target communication item includes a communication item that has recently been generated and saved, or that does not include a contextual title. In another example, the target communication item includes a generic title that lacks context, such that a contextual title is generated for the target communication item based on the embodiments disclosed herein.

On the other hand, in one example, a "plurality of communication items" refers to candidate communication items that the target communication item is compared against to determine "related communication items." In one example, the related communication items are a subset of the plurality of communication items that are determined to be most relevant to the target communication item, as discussed herein.

In one example and as set forth above, a "contextual title" includes any suitable string of alphanumeric characters that serve as short summaries of sections of the communication item. Certain contextual titles provide context for various functions and services, such as task tracking, indexing for ease of storage and retrieval, and integration with productivity applications (such as electronic calendars and web-based applications). Embodiments of the present disclosure facilitate determining that the contextual title includes a data instance representing data to be omitted from the contextual title based on a sensitivity policy. In one example, a "sensitivity policy" refers to at least one of a corporate, organizational, enterprise, state, federal sensitivity policy, or any suitable set of rules defining management of information. After determining that the contextual title includes a data instance representing data to be omitted from the contextual title based on a sensitivity policy, embodiments of the present disclosure include (1) determining representative tokens replacing the data instance from the contextual title and (2) generating, from the contextual title, a processed contextual title that comprises the representative tokens replacing the data instance from the contextual title. In one example, after the data instance has been removed from the contextual title, consistent with the sensitivity policy, the updated contextual title is referred to as a "processed contextual title."

Figure 4A:
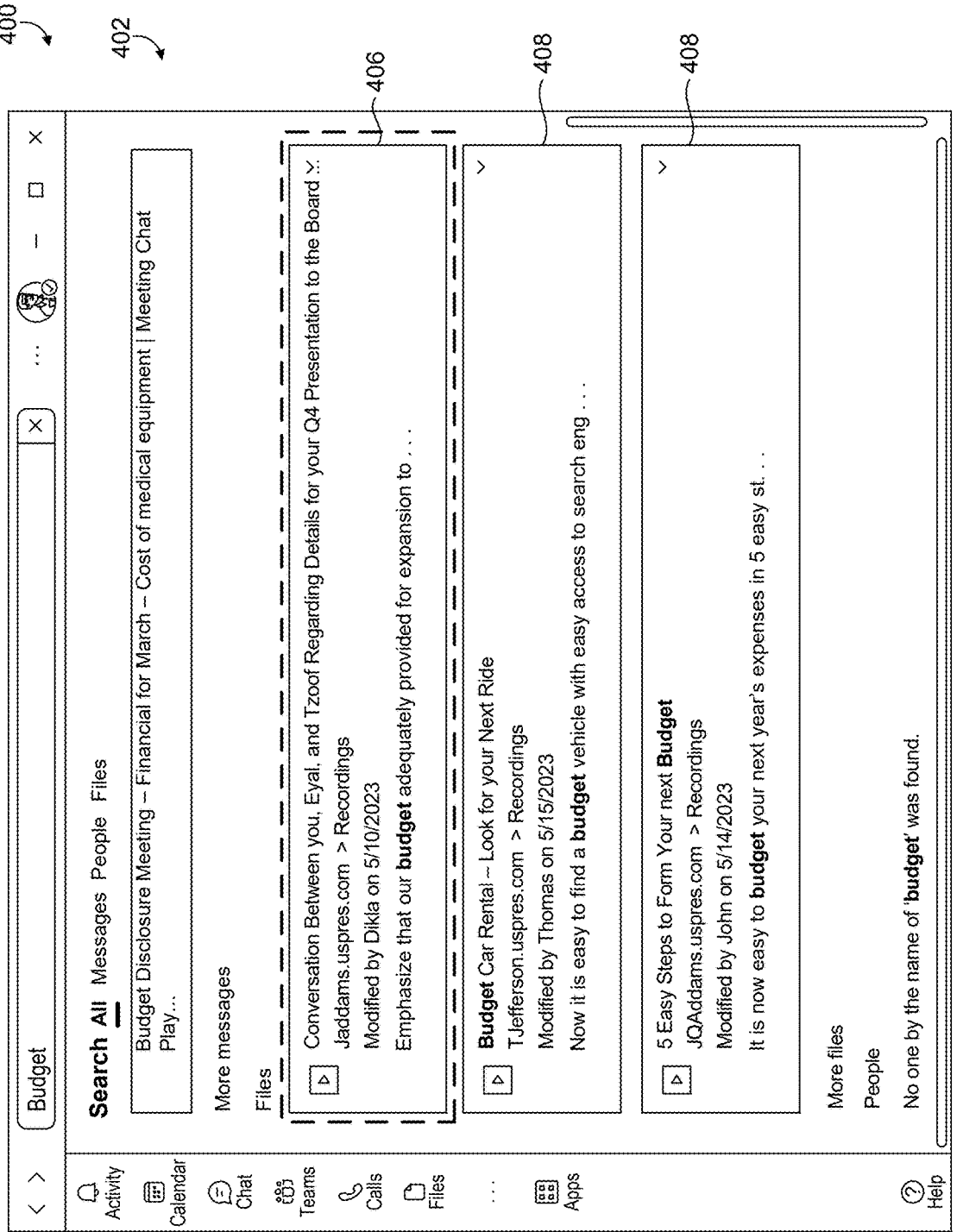
FIG. 4A illustratively depicts an example schematic screenshot from a personal computing device showing aspects of an example graphical user interface that presents a communication item that includes a contextual title for a first user in response to a user input, in accordance with an embodiment of the present disclosure.
Figure 4B:
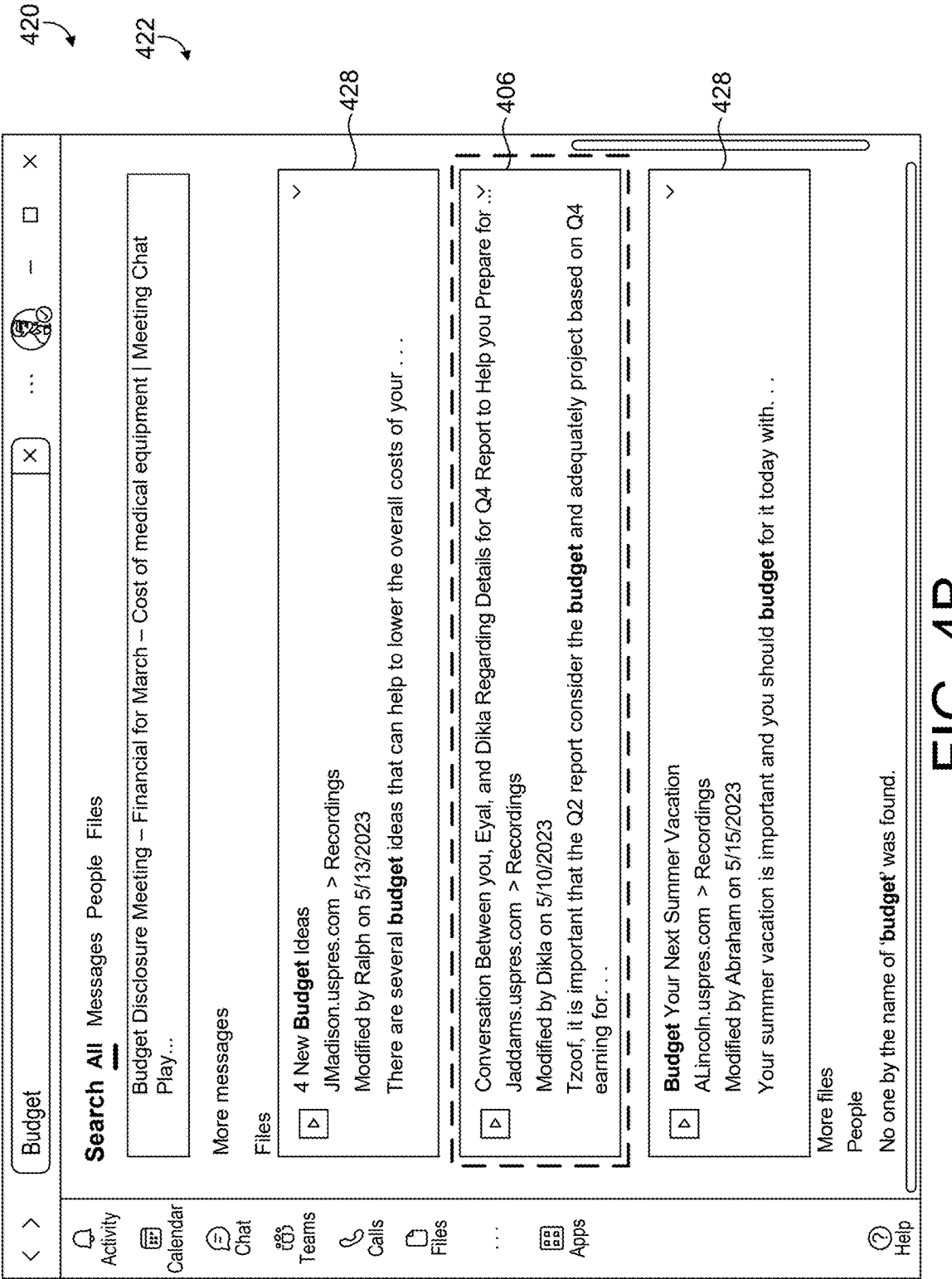
FIG. 4B illustratively depicts an example schematic screenshot from a personal computing device showing aspects of an example graphical user interface that presents a communication item that includes a contextual title for a second user in response to a user input, in accordance with an embodiment of the present disclosure.
Figure 4C:
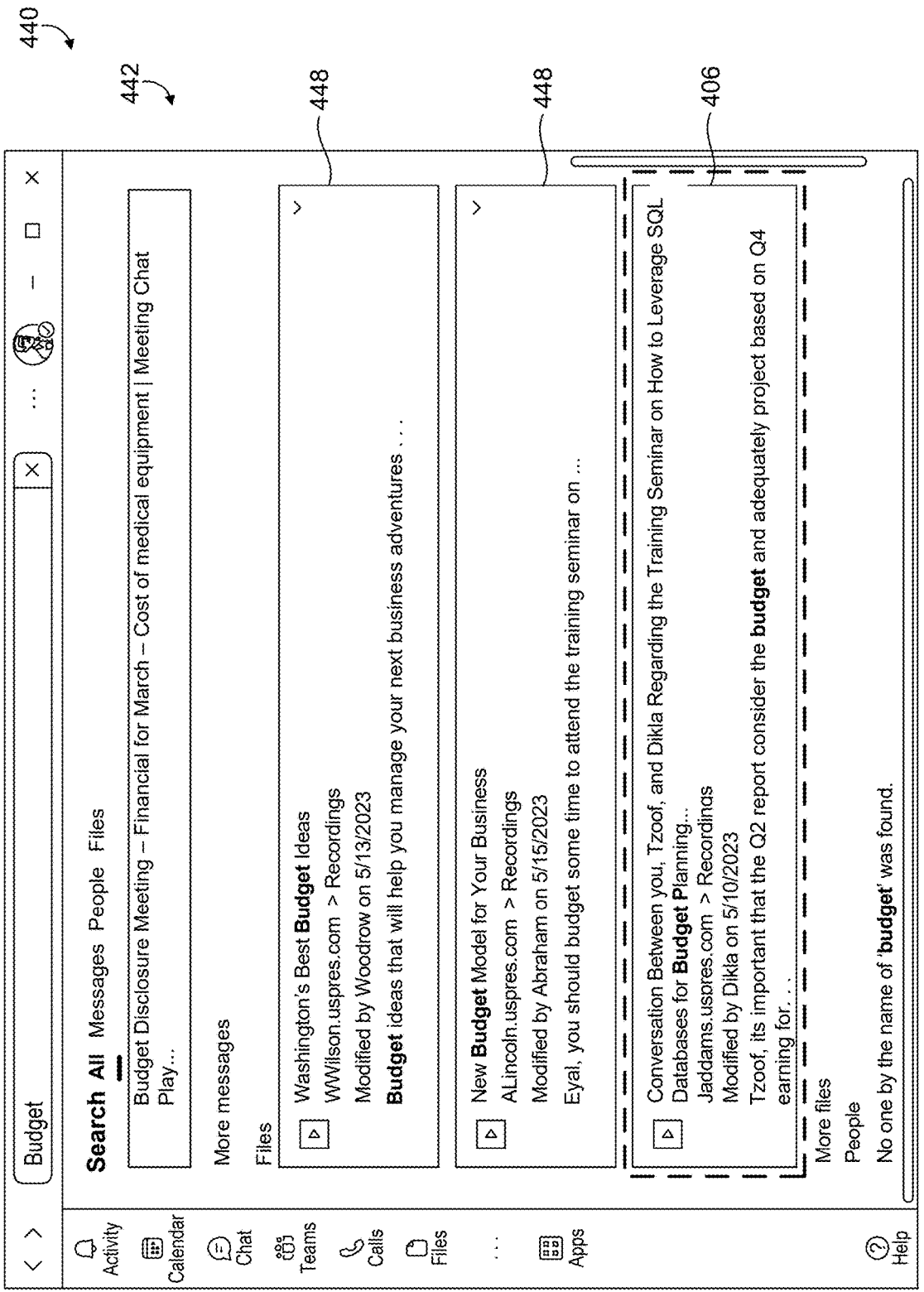
FIG. 4C illustratively depicts an example schematic screenshot from a personal computing device showing aspects of an example graphical user interface that presents a communication item that includes a contextual title for a third user in response to a user input, in accordance with an embodiment of the present disclosure.

In one example, an "entity" refers to a data structure occurring within a communication item. Example entities include a string of alphanumeric or other language characters, a word, a phrase (for example, consisting of two or more words), or any other suitable data structure contained in the communication item. In one embodiment, the entity corresponds to a category of data structure, such as whether the data structure corresponds to a particular meeting, task, commitment, deadline, request, personnel, relationship to personnel (as defined by a knowledge graph or collaborative network, for example), and so forth. Take, as a non-limiting example, which is illustrated in FIGS. 4A, 4B, and 4C, a meeting recording that includes a transcript of a conversation between three people (for example, "Dikla," "Eyal," and "Tzoof") discussing the fourth quarter enterprise finances and expenses. In this example, the transcript of the three-person conversation conducted during the meeting recording would be the target communication item for which a contextual title should be generated.

Embodiments of the present disclosure include determining that an entity occurs within the target communication item. Continuing the example above and illustrated in FIGS. 4A, 4B, and 4C, embodiments of the present disclosure determine that an entity, such as a "Second Quarter report for the subsequent year," was discussed during the meeting recording in the context of a deliverable due by a particular date. In this example, the entity can include (1) the discussion of the fourth quarter report or (2) the finalized second quarter report being due. Embodiments of the present disclosure can determine which entity is relevant for a particular person. For example, "the discussion of the fourth quarter report" is more relevant to Dikla, since she will be presenting to the board of directors about the fourth quarter report soon. Meanwhile, the entity "the finalized second quarter report being due" is more relevant to Tzoof because she is responsible for generating the report. Embodiments of the present disclosure include automatically determining relevance of the communication item or the entity occurring within the communication items to a particular user based on any of the techniques described herein, such as relevance determinations, knowledge graphs, or collaborative networks, to name a few. In this manner, entities that are personal and relevant to the user are determined to avoid less personal contextual titles.

Embodiments of the present disclosure include identifying, from the plurality of communication items, a set of related communication items that were timestamped within temporal proximity to the target communication item and that share at least a topic with the entity occurring within the target communication item. Continuing the example above, embodiments of the present disclosure identify other communication items that were timestamped (for example, saved, uploaded, recorded, or otherwise time-indexed) within a window of time relative to the target communication item, which in this example corresponds to the transcript of a meeting recording of the conversation between three people (for example, "Dikla," "Eyal," and "Tzoof") discussing the fourth quarter expenses. Example windows of time include any suitable window of time, such as any number of minutes, hours, days, weeks, months, years, or there between, and the like. In one embodiment, the window of time is dynamically adjusted, for example, based on a level of precision desired for the contextual title. For example, a window of time of one week would result in a smaller number of related communication items as compared to a window of time of four months, causing only those related communication items that recently occurred to be identified. In this manner, the computational space is reduced, allowing computations to be scaled across various users, while achieving more temporal accuracy in related communication items.

Thereafter, embodiments of the present disclosure include generating a contextual title for the target communication item based at least on the set of related communication items, the target communication item message, and the entity. Continuing the example above, an example contextual title for the target communication item for Dikla includes "Conversation between you, Eyal, and Tzoof regarding details for your Q4 presentation to the board." On the other hand, for this same communication item, an example contextual title for Tzoof includes "Discussion regarding details of Q4 report to help you prepare for finalizing your Q2 report due Jul. 3, 2023."

Embodiments of the present disclosure further include assigning the contextual title to a new metadata field associated with the target communication item. By adding a new metadata field, certain embodiments of the present disclosure preserve existing metadata that may be generated and used by other services or systems. In this manner, the contextual title minimally impacts other services that use other metadata fields of the communication item, causing the disclosed embodiments to seamlessly integrate into certain existing systems and services. Alternatively, in one embodiment, the contextual title replaces a file name or other title of the document. In this manner, the file size of the communication item remains substantially similar or minimally changed to preserve memory storage and facilitate scaling.

Overview of Technical Problems, Technical Solutions, and Technological Improvements As previously described, a communication service can be a useful tool for helping users communicate and distribute information in a near real-time manner, but often communication items, such as chats, video, and other forms of media communicated over the communication service are lengthy, cover a large number of topics, and fail to be indexed in an easily searchable manner. To make use of these communication items, certain users manually toggle to different portions of a target communication item to try to get an understanding of content contained in the target communication item. Although the title or file name of the communication item may provide low-level information, such as the title or timestamp associated with the communication item, this low-level information is not contextualized for a person, a group of people, or an organization. Therefore, certain users manually view the entire target communication item to determine what the target communication item is about. Accordingly, certain existing communication items provide more work for a user, instead of serving as a tool to improve efficiency for obtaining and generating information.

Accordingly, automated computing technology for automatically generating a contextual title that is relevant to a user (for example, personalized to the user), that is enhanced with metadata to improve the efficiency of search and storage, and that is easy for the user to consume can be beneficial for enabling improved computing applications and an improved user computing experience. For example, certain contextualized titles for a communication item, as disclosed herein, provide users with high-relevance contextual titles that are distinct from unrelated contextual titles and that relate to other related communication items. Certain contextual titles are automatically generated via a server-side computing device without the user even having to open or edit data or metadata associated with the communication item, thereby (1) conserving server-side bandwidth associated with a user opening a document and engaging with high-bandwidth content, such as a video contained in the briefing message, and (2) conserving client-side battery and bandwidth associated with consuming and editing the document. Further, embodiments of this disclosure address a need that arises from a large scale of operations created by software-based services that cannot be managed by humans. Moreover, the actions/operations described herein are not a mere use of a computer, but address results of a system that is a direct consequence of software used as a service offered in conjunction with user communication through services hosted across a variety of platforms and devices.

Further still, embodiments of this disclosure enable an improved user experience across a number of computer devices, applications, and platforms. Further still, embodiments described herein enable certain contextual titles to be programmatically surfaced and presented based on user-specific features, entities, and/or other communication items sourced from many sources associated with the user. Even if a user wanted to manually generate contextual titles for inclusion in a briefing message, certain existing technology does not allow for a contextual title to be generated with only a certain type of information in the contextual title (for example, that includes relevant and unique information, and that omits irrelevant and sensitive information, as discussed herein) because often a user may not have a personal understanding of another user's specific preferences to determine relevance of a contextual title to the user. Additionally, even if a human attempted to perform the operations described herein, the human would not be able to personalize and contextualize the contextual title for a large quantity of users having a wide variety of preferences and communication items, which would not be accessible to the human, for example, based on restrictions defined by a sensitivity policy. Some embodiments described herein reduce or eliminate a need for certain databases, data storage, and computer controls for enabling manually performed steps by a person, to (1) search, identify, assess, or view communication items to brainstorm a contextual title which may not even be relevant or helpful to a particular user; (2) generate a contextual title; and (3) configure (for example, by hard-coding) metadata associated with the communication item to improve search and indexing for the communication item. In this manner, certain embodiments disclosed herein reduce the consumption of computing resources, such as those associated with manually and blindly toggling through (1) a communication item to determine a contextual title for inclusion and (2) other communication items to consider relevance of other contextual titles and to validate uniqueness of the generated contextual title relative to other contextual titles.

ADDITIONAL DESCRIPTION OF THE EMBODIMENTS

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that operating environment 100 shown in FIG. 1 is an example of one suitable operating environment. Each of the components shown in FIG. 1 is implemented via any type of computing device, such as computing device 900 illustrated in FIG. 9, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 900 in FIG. 9. For instance, server 106 is provided via multiple devices arranged in a distributed environment that collectively provides the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

In some embodiments, user devices 102a and 102b through 102n comprise any type of computing device capable of use by a user. For example, in one embodiment, user devices 102a and 102b through 102n are the type of computing device 900 described in relation to FIG. 9. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, data sources 104a and 104b through 104n comprise data sources and/or data systems, which are configured to make data available to any of the various constituents of operating environment 100 or system 200 described in connection to FIG. 2. For instance, one or more data sources 104a and 104b through 104n provide (or make available for accessing) user-content data to communication data collection component 210 of FIG. 2. Certain data sources 104a and 104b through 104n are discrete from user devices 102a and 102b through 102n and server 106 or are incorporated and/or integrated into at least one of those components. In one embodiment, one or more of data sources 104a and 104b through 104n comprise one or more sensors, which are integrated into or associated with one or more of the user device(s) 102a, 102b through 102n or server 106. Examples of data made available by data sources 104a and 104b through 104n are described further in connection to communication data collection component 210 or storage 225 of FIG. 2.

Figure 2:
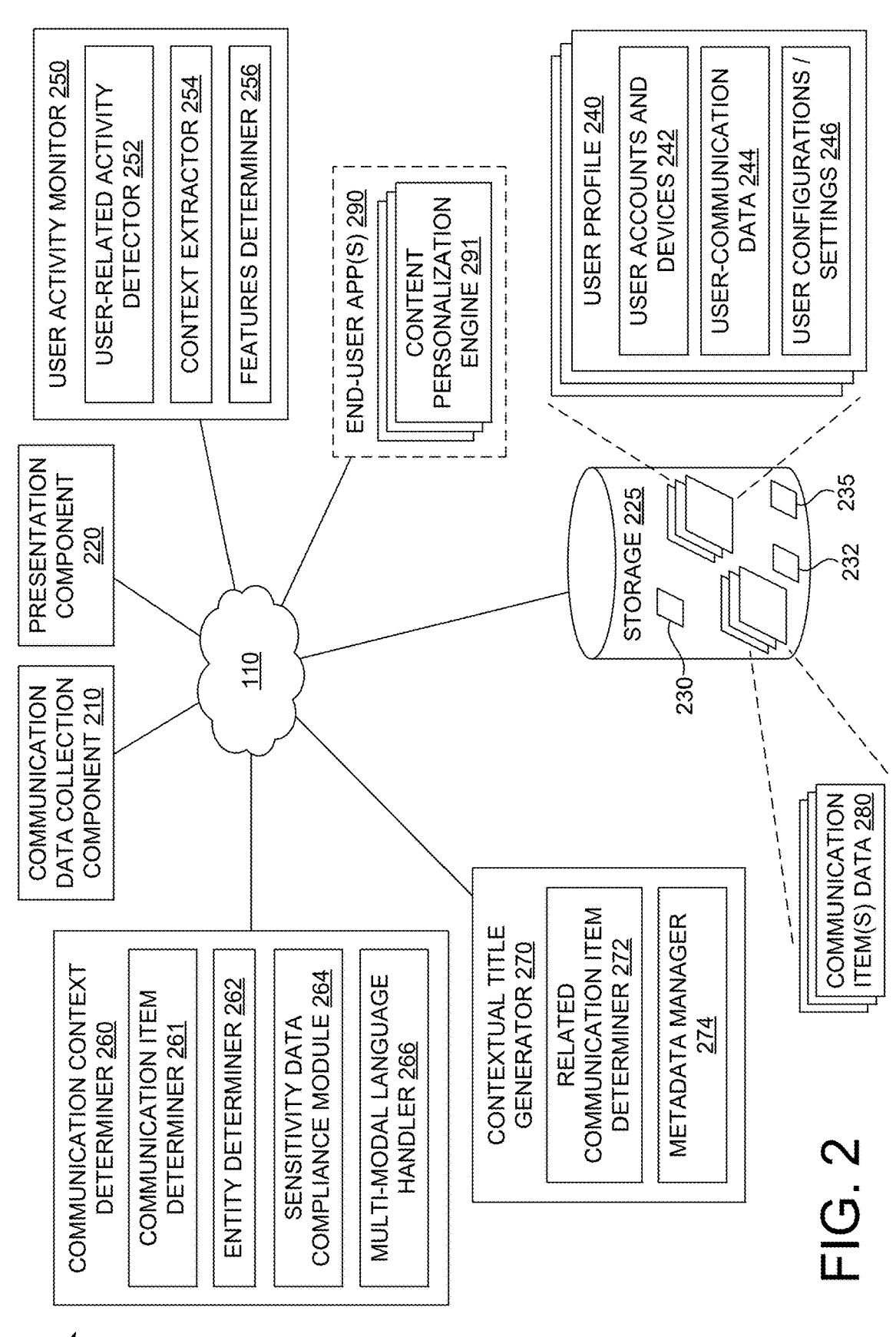
FIG. 2 is a diagram depicting an example computing architecture suitable for implementing aspects of the present disclosure.

Operating environment 100 can be utilized to implement one or more of the components of system 200, as described in FIG. 2, including components for accessing and collecting information from various communications items; for determining a communication context of a target communication item; receiving user preferences, and/or similar categories of data relevant to the user; for generating a contextual title for the target communication item; and/or consuming or presenting content to users. Operating environment 100 can also be utilized for implementing aspects of methods 600, 700, and 800 in FIGS. 6, 7, and 8, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements can be omitted altogether for the sake of clarity. Further, as with operating environment 100, many of the elements described herein are functional entities that are implemented as discrete or distributed components or in conjunction with other components, and in any suitable combination and location. In one example, the computing device 900 of FIG. 9 and the distributed computing device 1000 of FIG. 10 perform aspects of the system 200 of FIG. 2.

Example system 200 includes network 110, which is described in connection to FIG. 1, and which communicatively couples components of system 200, including communication data collection component 210, presentation component 220, user activity monitor 250, communication context determiner 260, contextual title generator 270, end-user application 290, and storage 225. User activity monitor 250 (including its subcomponents 252, 254, and 256), communication context determiner 260 (including its subcomponents 262, 264, and 266), end-user application 290, communication data collection component 210, and presentation component 220, may be embodied as compiled computer instructions or functions, program modules, computer software services, or an arrangement of processes carried out on one or more computer systems, such as distributed computing device 1000, described in connection to FIG. 10, for example.

In one embodiment, the functions performed by components of system 200 are associated with one or more computer applications, services, or routines, such as an online meeting application, a video-viewing application, a communications or collaboration application, or an organizational explorer application. The functions may operate to determine or provide communication item data 280 (including, without limitation, an entity identified for a target communication item, a sensitivity policy, related communication items, metadata for certain communication items, and so forth). In particular, such applications, services, or routines may operate on one or more user devices (such as user device 102a) or servers (such as server 106). Moreover, in some embodiments, these components of system 200 are distributed across a network, including one or more servers (such as server 106) and/or client devices (such as user device 102a) in the cloud, such as described in connection with FIG. 10; or reside on a user device, such as user device 102a.

Moreover, certain components, functions performed by these components, or services carried out by these components are implemented at appropriate abstraction layer(s), such as the operating system layer, application layer, hardware layer, etc., of the computing system(s). Alternatively, or in addition, certain functionality of these components and/or the embodiments described herein is performed, at least in part, by one or more hardware logic components. For example, and without limitation, illustrative types of hardware logic components include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), and so forth. Additionally, although functionality is described herein with regard to specific components shown in example system 200, it is contemplated that in some embodiments, functionality of these components can be shared or distributed across other components.

Continuing with FIG. 2, communication data collection component 210 is generally configured to access or receive (and in some cases also identify) communication data (for example, user-communication data 244). In one embodiment, user-communication data includes data associated with a user, data associated with communication items, or any other suitable data made available via one or more data sources, such as data sources 104a and 104b through 104n of FIG. 1. In some embodiments, communication data collection component 210 is employed to facilitate the accumulation of data of a particular meeting, or data of a particular user or group (or in some cases, a plurality of users including crowdsourced data) for user activity monitor 250 or its subcomponents, communication context determiner 260 or its subcomponents, the contextual title generator 270 or its subcomponents, or the end-user application 290. In one embodiment, the data is received (or accessed), and optionally accumulated, reformatted, and/or combined, by communication data collection component 210 and stored in one or more data stores such as storage 225, where it is available to other components of system 200. For example, the user-communication data is stored in or associated with a user profile 240, as described herein, such as in user-communication data 244 of user profile 240, or is stored in or associated with the communication item data 280, as described herein. In some embodiments, any personally identifying data (for example, user data that specifically identifies particular users) is either not uploaded or otherwise provided from the one or more data sources, is not permanently stored, is de-identified, and/or is not made available to other components of system 200, for example, as discussed with respect to the sensitivity data compliance module 264. In addition or alternatively, a user may opt into or out of services provided by the technologies described herein and/or select which user-communication data and/or which sources of user-communication data are to be captured and utilized by these technologies.

User-communication data, in one example, comprises any information that is related to a person and that person's interactions during a communication item, as well as information related to the communication item. User-communication data may be received from a variety of sources and available in a variety of formats. By way of example and without limitation, user-communication data comprises at least one of: audio information (for example, an audio file having a recording of sound and spoken content from the meeting); transcript information (for example, a document having text that has been extracted out of a meeting or video based on audio of the meeting or video and/or a chat of the region); contact information (for example, email, instant message, phone, and so forth associated with meeting attendees or meeting invitees, and can also specify a person's communication preferences); location information (for example, a person's current location or location of a particular office where they work); presence; user-related activity, which may comprise activity relevant to a user or group member, such as communication information (for example, past email, meetings, chat sessions, communication patterns or frequency, information about a user or other meeting attendees/invitees that the user had a meeting with or has an upcoming meeting with, or information about communications between a group member and one or more users), file access (for example, a file created, modified, or shared), social media or online activity, such as a post to a social media platform or website, subscription information, information regarding topics of interest to a user, or other user-related activity that may be determined via a user device (such as user device 102a of FIG. 1); task-related information (for example, an outstanding task that the user has with regard to a meeting or outstanding tasks that meeting attendees have with respect to the user); information about a group or group member that they may choose to share (for example, birthday, anniversary, etc.); or information in common with the user (for example, common project teams, work groups, backgrounds, education, interests, or hobbies). Additional examples of user-communication data are described herein.

In some embodiments, user-communication data received via communication data collection component 210 is obtained from a data source (such as data source 104a in FIG. 1, which is a meeting hosting site, a social networking site, a professional networking site, a corporate network, an organization's intranet or file share, or other data source containing user-communication data) or determined via one or more sensors (such as sensors 103a and 107 of FIG. 1), which are on or associated with one or more user devices (such as user device 102a), servers (such as server 106), and/or other computing devices. In one example, a sensor includes a function, routine, component, or combination thereof for sensing, detecting, or otherwise obtaining information such as user-communication data from a data source 104a, and is generally embodied as hardware, software, or both.

By way of example and not limitation, user-communication data includes data that is sensed, detected, or determined from one or more sensors (referred to in one example as sensor data or user-communication data), such as location information of mobile device(s), properties or characteristics of the user device(s), user-activity information (for example: app usage; online activity; searches; voice data such as automatic speech recognition; activity logs; communications data, including calls, texts, chats, messages, and emails; document comments or website posts; other user-communication data associated with communication events (including user history, session logs, application data, contacts data, calendar and schedule data, notification data, social-network data, e-commerce activity, user-account(s) data [which may include data from user preferences or settings associated with a personalization-related application, a personal assistant application or service, an online service or cloud-based account such as Microsoft 365, an entertainment or streaming media account, a purchasing club or services]); global positioning system (GPS) data; other user device data (which may include device settings, profiles, network-related information, payment or credit card usage data, or purchase history data); other sensor data that is sensed or otherwise detected by a sensor (or other detector) component(s), including data derived from a sensor component associated with the user (including location, motion, orientation, position, user access, user activity, network-access, user-device charging, or other data that is capable of being provided by one or more sensor components); data derived based on other data (for example, location data that can be derived from Wi-Fi, cellular network, or internet protocol [IP] address data), and nearly any other source of data that is sensed, detected, or determined as described herein.

In some embodiments, user-communication data, particularly in the form of context data or contextual information regarding a particular user, is received by communication data collection component 210 from one or more sensors and/or computing devices associated with the user. In some embodiments, communication data collection component 210, user activity monitor 250 or its subcomponents, contextual title generator 270 or its subcomponents, communication context determiner 260 or its subcomponents, or other components of system 200 determine interpretive data from received user-communication data. Interpretive data corresponds to data utilized by the components or subcomponents of system 200 that comprises an interpretation from processing raw data, such as a transcript extracted from raw audio from the communication item, or topic information interpreted from a communication item, such as a chat of a meeting, a transcript, and so forth. In one example, interpretive data is used to provide context to user-communication data, which generally supports determinations or inferences carried out by components of system 200. Moreover, it is contemplated that some embodiments of the disclosure utilize user-communication data alone or in combination with interpretive data for carrying out the objectives of the subcomponents described herein. It is also contemplated that some user-communication data is processed by the sensors or other subcomponents of communication data collection component 210 not shown, such as for interpretability by communication data collection component 210. However, embodiments described herein do not limit the user-communication data to processed data and may include raw data or a combination thereof, as described above.

In some respects, user-communication data is provided in user-communication data streams or signals. A "signal" can be a feed or stream of user-communication data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a calendar service, an email account, a credit card account, or other data sources. In some embodiments, communication data collection component 210 receives or accesses data continuously, periodically, as it becomes available, or as needed. In some embodiments, the user-communication data, which includes data indicative of the user's interactions during a meeting or while streaming a recording of the meeting, and which is received by communication data collection component 210 is stored in storage 225, such as in user-communication data 244 or communication item data 280.

User activity monitor 250 is generally responsible for monitoring user activity for information, for example, that is used for determining user-communication data for one or more users. In some embodiments, user-communication data associated with a particular user determined via user activity monitor 250 comprises contextual information. In some embodiments, this user-communication data is utilized by other components of system 200 to infer an intent of the particular user and/or to further determine a related communication item or communication item data 280, which is used to generate the contextual title that is provided to the particular user. In particular, embodiments of user activity monitor 250 determine user-communication data associated with a particular user, which includes user-related activity data and/or context data, and/or provides the determined user-communication data as structured data, such as one or more meeting data features, so that it may be used by other components of system 200. For instance, as further described herein, the user-communication data is used by communication context determiner 260 to determine communication item data 280 that is relevant to the user's context and complies with any data management policy (such as a sensitivity policy), which is indicated by the user-communication data. Accordingly, in some embodiments, user-communication data determined by user activity monitor 250 or its subcomponents is used to determine contextualized communication item data for the user. Certain user-communication data determined by user activity monitor 250 or its subcomponents is stored in a user profile 240 associated with a user, such as in user-communication data 244 of user profile 240, where it may be accessible to other components of system 200. Similarly, in some implementations, the communication item data determined by communication context determiner 260, or its subcomponents, is stored in a user profile 240, such as in user-communication data 244 of user profile 240, where it is accessible to other components of system 200.

In some embodiments, user activity monitor 250 determines current or near-real-time user activity information and also determines historical user activity information, which is determined based on gathering observations of user activity over time, accessing user logs of past activity (such as communication history, a user activity during a meeting, and the like, for example). Accordingly, user activity monitor 250 can determine current and historic user activity information that may be used by user activity monitor 250 or other components of system 200 to determine, for example, that: a meeting or other communication item is taking place; a meeting or other communication item has occurred; a user is listed as an invitee for a meeting or other communication item; a user is listed as an attendee for the meeting or other communication item; a role of a user within an organization (for example, professor or student); a description of a meeting or other communication item; a time and date during which the meeting is taking or took place; other communication items in which the user participated (for example, spoke); and an indication that the particular user and the other users have attended meetings or other communication items together, have similar interests or similar characteristics, have worked in the same office or location, or that the particular user and the other user share a connection with a third user.

In some embodiments, the user-communication data determined by user activity monitor 250 (or its subcomponents) includes user-related activity information from one or multiple user devices associated with a user and/or from cloud-based services associated with a user (such as email, meeting information sources, calendars, social media, or similar information sources), and/or includes contextual information associated with the user activity or user-communication data. For example, information about user activity on a particular device or cloud-based service is used to determine a context associated with the user, which is used for determining a contextual title provided to the user or to a computing application or service. In an embodiment, user activity monitor 250 includes one or more computing applications or services that analyze information detected via one or more user devices used by a user and/or cloud-based services associated with the user to determine activity information and/or contextual information. Information about user devices associated with a user may be determined from the user-communication data made available via communication data collection component 210, and may be provided to user activity monitor 250 or other components of system 200. In some embodiments of user activity monitor 250, a user device is identified by detecting and analyzing characteristics of the user device, such as device hardware, software (such as operating system [OS]), network-related characteristics, user accounts accessed via the device, and similar characteristics. For example, information about a user device is determined by using functionality of many operating systems to provide information about the hardware, OS version, network connection information, installed application, or the like. The length of the contextual title that certain user devices present are based on the type of user device. For example, a mobile device presents a contextual title of a shorter length, such as fewer characters or a smaller font size, than a laptop device, at least because there is more screen size on the laptop device.

Some embodiments of user activity monitor 250 or its subcomponents determine a device name or identification (device ID) for each device associated with a user. This information about the identified user device(s) associated with the user may be stored in a user profile associated with the user, such as in user accounts and devices 242 of user profile 240. In an embodiment, a user device is polled, interrogated, or otherwise analyzed to determine information about the device. For example, this information is used for determining a label or identification of the device (for example, a device ID) so that user interaction with the device may be recognized from user-communication data by user activity monitor 250. In some embodiments, users declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account (MSA), email account, social network, or the like, are identified and determined to be associated with the user.

As shown in example system 200, user activity monitor 250 comprises a user-related activity detector 252, context extractor 254, and features determiner 256. In some embodiments, user activity monitor 250, one or more of its subcomponents, or other components of system 200 determines interpretive data based on received user-communication data, such as described previously. It is contemplated that embodiments of user activity monitor 250, its subcomponents, and other components of system 200 may use the user-communication data and/or interpretive data for carrying out the objectives of the subcomponents described herein. Additionally, although several examples of how user activity monitor 250 and its subcomponents identify user-related activity information are described herein, many variations of user activity identification and user activity monitoring are possible in various embodiments of the disclosure.

User-related activity detector 252, in general, is responsible for determining (or identifying) that a user action or user-activity event has occurred. Embodiments of user-related activity detector 252 are used for determining current user activity or historical user actions. Some embodiments of user-related activity detector 252 monitor user-communication data for activity-related features or variables corresponding to various user activities such as indications of user inputs into a chat, locations or visits, information about meetings attended, identities of speakers in the meeting, applications launched or accessed, files accessed or shared, websites navigated to, media played, or similar user activities. Additionally, some embodiments of user-related activity detector 252 extract, from the user-communication data, information about user-related activity, which includes current user activity, historical user activity, and/or related information such as context.

Alternatively, or in addition, in some embodiments context extractor 254 determines and extracts context. Similarly, in some embodiments features determiner 256 extracts information about a user or a communication item based on an identification of the activity determined by user-related activity detector 252. Examples of extracted user-related activity information include user location, app usage, online activity, searches, communications such as chat, call, or user-communication item data (including, for example, the duration of meeting, topics of the meeting, and speakers of the meeting), types of communication items with which a user interacted, usage duration, application data (for example, emails, meeting invites, messages, posts, user statuses, notifications, etc.), or nearly any other data related to user interactions with the user device or user activity via a user device. For example, a user's location is determined using GPS, indoor positioning (IPS), or similar communication functionalities of a user device associated with a user.

In some embodiments, data determined from user-related activity detector 252 is provided to other subcomponents of user activity monitor 250 or other components of system 200, or is stored in a user profile associated with the user, such as in user-communication data 244 of user profile 240. In some embodiments, user-related activity detector 252 or user activity monitor 250 (or its other subcomponents) performs conflation on detected user-communication data. For example, overlapping information is merged and duplicated, or redundant information is eliminated. In one embodiment, user-related activity detector 252 or user activity monitor 250 (or its other subcomponents) performs certain functionality performed by the sensitivity data compliance module to remove or modify user-communication data to ensure compliance with a sensitivity policy.

Context extractor 254 is generally responsible for determining a context associated with user-related activity or user-communication data. As further described herein, a context (or context logic) may be used to determine a context for a target communication item, for determining or generating a contextual title, or for consumption by a computing application. By way of example, a context comprises information about a user's current activity, such as application usage, communication item consumption time, communication or interaction during a communication item or while watching a communication item (such as a meeting recording), and/or a user's interaction with an element of a communication item (chat, a text window, and the like) or other suitable interactions. For instance, a context can indicate types of user activity, such as a user attending or scheduling a meeting, sending a message (to the entire audience chat or directly to one or more other users), or viewing a meeting recording. Alternatively, or in addition, a user may explicitly provide a context, such as performing a query for a particular topic or meeting, which may be performed via a meeting hosting application, an organizational explorer application, and the like. In one embodiment, a context includes information about a communication item, such as a meeting recording, with which the user is interacting or accessing information about, as in where a user hovers their mouse over an indication of a meeting, meeting recording, or other suitable graphical user interface (GUI) elements.

Some embodiments of context extractor 254 determine context related to a user action or activity event, such as people entities identified in a user activity or related to the activity (for example, recipients of a message or chat sent by the user, which is sent to an alias corresponding to the audience or meeting attendees), which includes nicknames used by the user (for example, "professor" and "classmate," referring to specific entities identified in the user's contacts by their actual names, or group names such as "project team" or "book club," which refer to specific groups of people identifiable from user-communication data), and utilize a named-entity extraction model or named-entity recognition model. Embodiments of context extractor 254 also determine context features such as: meeting-attendee data; meeting-invitee data; contextual information about a type of communication item; other information about the communication item such as a description of the communication item, topics covered during the communication item, and so forth; information detected by sensor(s) on user devices associated with the user that is concurrent or substantially concurrent to the detected user activity; or any other data related to the user activity that is detectable and used for determining a context of the user-related activity.

In some embodiments, context extractor 254 comprises one or more applications or services that parse or analyze information detected via one or more user devices used by the user and/or cloud-based services associated with the user to identify, extract, or otherwise determine a user-related or user-device-related context. Alternatively, or in addition, some embodiments of context extractor 254 may monitor user-communication data, such as that received by communication data collection component 210 or determined by user-related activity detector 252, for information that may be used for determining a user context. In some embodiments, this information comprises features (sometimes referred to herein as "variables") or other information regarding specific user-related activity and related contextual information. Some embodiments of context extractor 254 determine, from the monitored user-communication data, a user context associated with a particular user, user device, or a plurality of users (such as a specific group of people, a group of people sharing a role within an organization, a student, a professor, or faculty) and/or user devices. In some embodiments, a user context determined by context extractor 254 is provided to other components of system 200 or stored in a user profile 240 associated with a user, such as in user-communication data 244 of user profile 240, where it is accessed by other components of system 200.

Features determiner 256 is generally responsible for determining or extracting one or more data features (or variables) characterizing the user or communication item, and/or for determining structured user data associated with a user or communication item. In one embodiment, data features are determined from user-communication data received from communication data collection component 210 or from user-related activity data, which may include context data determined by user activity monitor 250. In some embodiments, features determiner 256 receives information from one or more of these other components of system 200 and processes the received information to determine one or more data features that are specific to a user. For example, user-communication data processed by features determiner 256 comprises unstructured, semi-structured, or structured data about a user (or other users). In some embodiments, this received user-communication data is converted into a structured data schema or record, a feature vector, one or more data feature-value pairs, or other data record that is usable for determining a contextual title. Certain meeting data features or structured user-communication data determined by features determiner 256 are provided to other components of system 200 or stored in a user profile associated with a user, such as in user-communication data 244 of user profile 240, where it may be accessed by other components of system 200.

Examples of data features determined or extracted by features determiner 256 include, without limitation: data from information sources associated with the user, such as an organizational chart or employment data (for example, who a user reports to, works with, manages [or who reports to a user]); a user's role; information about project team(s), which can include project team members or similar information; social media or social collaboration information sources (for example, the user's LinkedIn® connections or GitHub® contributions or collaborations); location-related features; venue-related information associated with the location or other location-related information; other users present at a venue or location; time-related features; current user-related features, which include information about the current or recent user of the user device; user device-related features, such as device type (for example, desktop, tablet, mobile phone, fitness tracker, heart rate monitor, or other types of devices), hardware properties or profiles, operating system (OS) or firmware properties, device IDs or model numbers, network-related information, position/motion/orientation-related information about the user device, network usage information, app usage on the device, user account(s) accessed or otherwise used (such as device account[s], OS level account[s], or online/cloud-service related account[s] activity, such as Microsoft® MSA account, online storage account[s], email, calendar, meetings, or social networking accounts); content-related features, such as meeting topics, presentations, a text transcript of the meeting (that is correlated to a timing or duration of the meeting, a speaker of the meeting, or topic), or attendees; user activity, such as verbal commands, searches, browsed websites, purchases, social networking activity, communications sent or received including social media posts; or any other features that are detected or sensed and used for determining data associated with or characterizing a user or meeting.

Some embodiments of features determiner 256, or more generally user activity monitor 250, can determine interpretive or semantic data from the user-communication data, which is used to determine data features or other structured user data. For example, while a user-activity feature indicates a meeting attended by the user, a semantic analysis determines information about the meeting, such as that the meeting topic concerns a financial task for which the user has an upcoming deadline. Thus, the semantic analysis may determine additional user-activity related features or user data that is semantically related to other data and which may be used for further characterizing the user or for determining a context.

In one embodiment, a semantic analysis is performed on at least a portion of user-communication data to characterize aspects of the user-communication data. For example, in some embodiments, user-related activity features are classified or categorized such as by type, time frame or location, work-related, home-related, themes, related entities, other user[s] [such as communication to or from another user], and/or relation of the other user to the first user [for example, family member, close friend, work acquaintance, boss, or the like, or other categories], or related features are identified for use in determining a similarity or relational proximity to other user-related activity events. In some embodiments, a semantic analysis utilizes a semantic knowledge representation, such as a relational knowledge graph. A semantic analysis may also utilize semantic analysis logic, including rules, conditions, or associations to determine semantic information related to a user activity. For example, a user-related activity event comprising a message sent to another meeting attendee during the meeting is characterized as a work-related activity, which is used to infer a relationship that the user works with the message recipient. A semantic analysis may also be used to further determine or characterize a context, such as determining that a topic of a meeting that has been watched by the user is associated with user-related activity corresponds to a target communication item based on time spent or frequency the user has accessed the meeting recording or portion of the meeting recording. For example, the user's topic of interest is determined (using semantic analysis logic) to be the topic of the meeting recordings the user has spent the most time watching. Similarly, the semantic analysis may determine other suitable related communication items.

Continuing with FIG. 2, communication context determiner 260 is generally responsible for determining a context or other relevant information associated with a target communication item based on user-communication data. Embodiments of communication context determiner 260 determine and generate a context or other relevant information about the target communication item based on the user activity monitor 250. Thus, information about a target communications item's context to be generated may be received from the user activity monitor 250 or the user-communication data 244 in storage 225. In one embodiment, the context and other related information, such as an entity, sensitivity data, and processed multi-language inputs as generated or determined by the communication context determiner 260 (or its subcomponents) are stored as communication item data 280, where it is used by other components or subcomponents of system 200, such as the contextual title generator 270. Alternatively or in addition, context and other related information determined by communication context determiner 260 can be provided to a user, such as a user for whom the context and other related information is determined. In some embodiments, the context and other related information determined by communication context determiner 260 (or its subcomponents) comprises an entity, sensitivity data, and processed multi-language inputs.

Some embodiments of communication context determiner 260 utilize communication context logic 230 to a context or other related information about a target communication item. In one embodiment, communication context logic 230 comprises computer instructions including rules, conditions, associations, predictive models, classification models, or other criteria for, among other operations, determining a target communication item, determining relevance of a target communication item to a particular user, scoring or ranking a target communication item relative to other communication items for relevance, indexing a target communication item, or contextualizing a target communication item for a user. Communication context logic 230 may take different forms, depending on the particular type of communication item. In some embodiments, communication context logic 230 comprises any suitable rules, such as Boolean logic, various decision trees (for example, random forest, gradient-boosted trees, or similar decision algorithms), conditions or other logic, fuzzy logic, neural network, finite state machine, support vector machine, machine-learning techniques, or combinations of these to determine (or facilitate determining) a context or other related information for a communication item according to embodiments described herein.

Further, in some embodiments, the dedicated subcomponent utilizes communication context logic 230 that is specific for determining certain information about a target communications item. For instance, as shown in example system 200, communication context determiner 260 comprises communication item determiner 261, entity determiner 262, sensitivity data compliance module 264, and multi-modal language handler 266.

Communication item determiner 261, in general, in responsible for determining a target communication item and a plurality of communication items. In some embodiments, the communication item determiner 261 determines the target communication item and the plurality of communication items from user-communication data 244, as well as any data received from the communication data collection component 210. As set forth above, in one example, a "target communication item" refers to a communication item for which a contextual title is generated based on the embodiments disclosed herein. For example, a target communication item includes a communication item that has recently been generated and saved, or that does not include a contextual title. In another example, the target communication includes a generic title that lacks context, such that a contextual title is generated for the target communication item based on the embodiments disclosed herein. On the other hand, in one example, a "plurality of communication items" refers to candidate communication items that the target communication item is compared against to determine "related communication items." For example, in one example, the related communication items are a subset of the plurality of communication items that are determined to be most related to the target communication item, as discussed herein.

In some embodiments, the communication item determiner 261 determines a hierarchy of communication items. For example, a communication item that includes an entire conversation session can be broken up into a plurality of segments, such that the plurality of segments correspond to communication items of the entire conversation session. In this example, the entire conversation history is the parent communication item of the child communication items (in this example, are the communication items corresponding to the plurality of segments).

In one example, a "segment" refers to a portion of the communication item, or the meeting recording, having a length of time defined between a start time and an end time. The length of time of the segment is less than the length of time of the (entire) parent communication item. In one embodiment, the segment has a start time associated with a time corresponding to initiation of an utterance, a gap (for example, a portion of the meeting or meeting recording during which no audio or visual content is being provided), or a visual transition (for example, starting or ending visual content or transitioning slides in a presentation), and has an end time corresponding to a meeting time when the corresponding utterance, gap, visual transition ends, or a second and subsequent visual transition occurs. In one example, the ending or initiation is determined based on a change in sound parameters (for example, speaker, frequency [or sound pitch], amplitude [or dynamics or loudness], wave form, wave duration, timbre [or tone color], and so forth), or visual parameters.

In one embodiment, the content of the segment shares a common data feature, such as an indication of: a speaker, a topic, an audio content, a visual content, an application that is presented, a meeting attendee screen that is presented, or any other data feature. For example, a first segment corresponds to a portion of the conversation session during which a first topic is being covered, a second segment corresponds to a portion of the conversation session during which a second topic was covered, and a third segment corresponds to a portion of the conversation session during which audio gaps (or no audio) occurs. As another example, a first segment corresponds to a portion of the conversation session during which a first speaker was speaking, and a second segment corresponds to a portion of the conversation session during which a second speaker was speaking.

Embodiments of the communication item determiner 261 make available the target communication item and the plurality of communication items to other components of system 200. For example, the entity determiner 262 accesses the target communication item (and corresponding segments) to determine an entity, as discussed herein.

Entity determiner 262, in general, is responsible for determining that an entity occurs within a target communication item and determining a context for the target communication. In one example, an entity is received in response to a user search for a particular term, such as the word "budget" in FIGS. 4A, 4B, and 4C. In one example, the context for the target communication item is based on the occurrence of a particular entity within the target communication item. As discussed above, "entity" refers to a data structure occurring within a communication item. Example entities include a string of alphanumeric or other language characters, a word, a phrase (for example, consisting of two or more words), or any other suitable data structure contained in the communication item. In one embodiment, the entity corresponds to a category of data structure, such as whether the data structure corresponds to a particular meeting, a task, a commitment, a deadline, a request, personnel, a user identity, a relationship to personnel (as defined by a knowledge graph or collaborative network, for example), and so forth.

Embodiments of entity determiner 262 determine an occurrence or a number of times that a particular person or entity was mentioned during the meeting. For example, the mention of the person or entity can include, without limitation, instances during the communication item when a speaker uttered the name or identity of the person or entity, such as when the speaker uttered the name of the user or any person determined to be of interest to the user based on the user profile 240. Example entities can be determined based on references to the entity made by the user or anyone during the communication items, such as via chats, post-meeting question-and-answer sessions, or chat sessions. Embodiments of entity determiner 262 use user-communication data associated with a user and with the communication item to identify an entity and determine a frequency of times the entity was mentioned in a particular communication item. The user-communication data is received, for example, from user activity monitor 250, communication data collection component 210, or from storage 225, such as from a user profile 240 or communication item data 280.

In some embodiments, an entity determined by entity determiner 262 is ranked for relevance to the user so that entities that are more relevant are given priority and/or provided over entities that are less relevant. For example, communication context logic 230 is used to determine relevance of the entity to a particular user, determine percentage of the communication item spent discussing the entity, as well as score or rank events of interest for relevance. In particular, relevance to a user may be determined based on any number of criteria such as, without limitation, freshness (or how recently the entity occurred); the number of times the entity was mentioned during the communication item (for example, as determined by processing a transcript of the meeting); or the importance of the entity for the user.

In some embodiments, entity determiner 262 determines a speaker (or person) associated with the entity. For example, a speaker might include a person who spoke about or referenced the entity for more than a threshold amount of time, such that those speakers who do not speak for a duration exceeding the threshold amount of time are classified as not speakers (and instead classified as people interrupting a meeting by asking questions or clarifying a point made by the speaker). In some embodiments, entity determiner 262 determines relationship data indicative of a relationship between the speaker (who uttered the entity) and the user, which is determined from an organizational chart or contacts list, or other user-communication data is processed to determine a speaker and the speaker's relationship to the user. In some embodiments, the entity is ranked for relevance based on a relationship of the speaker associated with the entity (for example, that spoke the entity)

relative to the user. For example, a speaker who has a closer or stronger work relationship to the user has a higher ranked entity than a speaker who has a less close or weaker work relationship to the user.

In some embodiments, the entity determiner 262 determines specialized information of the communication item, such as topics covered during a corresponding segment of a meeting recording or keywords provided during the meeting recording. Embodiments of entity determiner 262 determine explicit usage of keywords or inferred topics covered during a communication item. For instance, a user (or an administrator) creates a list of topics or specifies content keywords that are relevant to the user. Alternatively or in addition, the keywords or topics may be automatically generated by the entity determiner 262, for example, based on user-communication data. Some embodiments employ user-communication data to determine content from which entity determiner 262 can infer topics and/or keywords within a communication item. Once the content is determined, according to an embodiment, entity determiner 262 performs a topic analysis operation (or topic detection, topic modeling, or topic extraction) to determine one or more topics from the communication item. In some embodiments, the frequency or recency of topic(s) determined by the topic analysis is determined such that those topics occurring frequently or recently are determined to be more related than those occurring less frequently or less recently.

Some embodiments of entity determiner 262 determine topics or keywords that are relevant to a user based on communication context logic 230 and/or based on user-communication data associated with the user or the communication item, as described herein. For example, topics or keywords that are relevant to a user comprise topics or keywords that are similar to topics or keywords occurring in recent user activity performed by the user.

Sensitivity data compliance module 264, in general, is responsible for determining whether a communication item has sensitive content. In one example, determining whether a communication item has sensitive content is based on a sensitivity policy. In one example, "sensitive content" refers to data that should be guarded from unauthorized access or unwarranted disclosure to maintain the information security of an individual, entity, or organization. Example sensitive content includes personally identifiable information (PII), such as educational information, financial information (for example, credit card numbers, banking information, tax forms, and credit reports); business information, such as intellectual property, trade secrets, consumer and supplier records, and plans for a merger; or classified information, such as government data, and the like. Sensitive content may be contained in audio or visual content (for example, a video, a document, an image, or any other tangible media) displayed during a meeting. In one example, sensitive content also refers to any subjective data that a user does not wish to share for any reason, such as embarrassment, reputational harm, and the like. In one embodiment, sensitive content is defined by a corporate, organizational, enterprise, state, or federal sensitivity policy that is accessed to determine sensitive content that the meeting presentation may contain. As discussed herein, in one example, a "sensitivity policy" refers to at least one of a corporate, organizational, enterprise, state, federal sensitivity policy, or any suitable set of rules defining management of information.

After the communication context determiner 260 identifies a target communication item, embodiments of the sensitivity data compliance module 264 determines whether the target communication item includes sensitivity content.

Alternatively or additionally, embodiments of the sensitivity data compliance module 264 determine whether the contextual title generated by the contextual title generator 270 includes sensitive content. Alternatively or additionally, embodiments of the sensitivity data compliance module 264 determines whether the related communication items (determined by the related communication item determiner 272) include sensitive content. In one embodiment, the sensitivity data compliance module 264 flags or labels the data structure (for example, a portion of the communications item or contextual title) that contains the sensitive content as a data instance representing data to be omitted.

After determining that the contextual title includes a data instance representing data to be omitted from the contextual title, embodiments of sensitivity data compliance module 264 determines representative tokens replacing the data instance from the sensitive content. For example, suppose a regional sensitivity policy prohibits the distribution of personal identification information, such as a birthday. In this example, the sensitivity data compliance module 264 would identify data instances indicative of a birthdate, such as "born in Mar. 19, 1994," and replace with a representative token such as "<date>," "<sensitive, >" or any generic description that does not contain sensitive content.

After replacing the sensitive content with the representative token, embodiments of sensitivity data compliance module 264 make accessible the sensitivity compliant data, such as the communication item(s) or contextual title that has the sensitive content removed. As discussed herein with respect to the contextual title generator 270, the contextual title that has sensitivity content removed is referred to herein in one example as "processed contextual title."

Continuing with FIG. 2, the multi-modal language handler 266 is generally responsible for identifying multiple languages within a communication item or a contextual title. In one embodiment, the multi-modal language handler 266 employs any suitable language logic 232 to identify and characterize a string of text based on the characters and meaning of the string of text. In one embodiment, the multi-modal language handler 266 identifies text that deviates from a target language or languages that the user has designated in his or her user configurations/settings 246. For example, suppose a user has user configurations/settings that indicate the user's language preference is English. Based on this example preference, certain embodiments of multi-modal language handler 266 identify instances of the communication item that are not in English and assign a default character string to the identified instances. For example, instances identified to not be in English and instead be in Arabic or Hebrew are assigned default characters that simplify the determination of related communication items by related communication item determiner 272. In this example, the default characters are not analyzed to determined relatedness between communication items, thereby reducing the quantity of data used to determine related communication items by related communication item determiner 272.

In some embodiments, the language logic 232 includes any suitable natural language processing (NLP) model. In one example, the multi-modal language handler 266 determines, using the NLP, that a respective communication item of the plurality of communication items include a transcript (for example, an audio transcript) that includes multi-language content. Based on the determination that a communication item comprises multi-language content, in this example, the multi-modal language handler 266 assigns a default character string to the communication item. In this manner, the default character string is not used to determine a topic for the communication item (for example, by the entity determiner 262). In this example, the related communication item determiner 272 identifies the set of related communication items that share at least the topic with the entity occurring within the target communication item by comparing the default character string to the entity occurring within the target communication item.

Continuing with example system 200 of FIG. 2, contextual title generator 270 is generally responsible for determining a contextual title for a communication identified by the communication context determiner 260 or the communication data collection component 210. Certain embodiments of contextual title generator 270 assemble, format, or prepare data for inclusion into a contextual title. Certain data associated with a communication item can be received from communication context determiner 260 (or its subcomponents), from communication item data 280, or from communication data collection component 210. In some embodiments, user-communication data associated with a particular user, which indicates that user's context and/or intent when interacting with a target communication item, is used by contextual title generator 270 to identify related communication items, generate a contextual title, and modify or add metadata to a target communication item associated with the user. Thus, contextual title generator 270 also may receive user-communication data for a user and/or meeting from user activity monitor 250 (or its subcomponents), communication data collection component 210, or a user profile 240. Further, in some embodiments of contextual title generator 270, the presentation or formatting of the contextual title provided to the user is determined based on the user-communication data associated with the user, such as described herein.

Related communication item determiner 272 is generally responsible for identifying communication items (also referred to herein in one example as "related communication items") that are related to a target communication item for which a contextual title will be generated. In one embodiment, related communication item determiner 272 determines the related communication items based on at least one of a window of time or a threshold quantity of related communication items. In particular, embodiments of related communication item determiner 272 identify up to a threshold quantity of related communication items that have been timestamped within a window of time relative to the target communication item. For example, suppose system 200 generates a contextual title for a target communication item. In this example, further suppose that related communication item determiner 272 identifies (up to) the twenty most related communication items within temporal proximity to the target communication item. Thus, the communication items outside of this window of time for temporal proximity are omitted from determination for relevancy to the target communication item.

In one example, "temporal proximity" refers to the time relationship between two communication items being within a window of time. For example, for a window of time within 1 week, the related communication items within temporal proximity to the target communications item correspond to the related communication items that have been time-stamped within a time window defined up to one week prior or one week after the timestamp of the target communication item.

In one embodiment, the related communication item determiner 272 identifies a plurality of related communication items based on a relevance weight for each of the plurality of related communication items (for example, that are within temporal proximity to the target communication item). Some embodiments of communication context determiner 260 employs contextual title logic 235 to determine relevance of a plurality of communication items to a target communication item. Relevance weights of the plurality of communication items can be used to determine which of the plurality of communication items to classify as related communication items used to determine the contextual title to provide to a user. For instance, according to some embodiments, the contextual title generator 270 accesses a plurality of communication items determined by communication context determiner 260 (or its subcomponents). Then, in one embodiment, for each communication item, the related communication item determiner 272 determines a relevance weight that is used for inferring relevance of a communication item to the target communication item. The relevance may be to the user such that a high weighting (or, conversely, a low weighting) indicates higher (or lower) relevance. Embodiments of related communication item determiner 272 or contextual title logic 235 use user-communication data associated with the plurality of communication items to determine the relevance of the plurality of communication items to target communication items and to the user, which is represented as the relevance weight.

A relevance weight of the plurality of communication items is determined, for example and without limitation: based on a semantic analysis of the plurality of communication items relative to the target communication item, based on the particular type or category of the communication item; based on user history, such as whether the user has previously been presented (or engaged) with a particular communication item; and/or based on settings or preferences, which can be configured by the user or an administrator, such as user configurations/settings 246 in a user profile 240.

In some embodiments, relatedness is based on a degree of similarity, which comprises a similarity (or dissimilarity) measure. For example, the similarity measure is determined using a similarity function, distance measurement, clustering, correlation, dissimilarity matrix, statistical relatedness, or other suitable measure of relatedness. For instance, one embodiment uses a semantic similarity. In one embodiment, the degree of similarity is expressed as a percentage, ratio, threshold value, or any combination thereof. In one embodiment, the degree of similarity is expressed as a threshold percentage of total data features shared between the communication items and the target communication item, such that a higher percentage (for example, higher than a first threshold) of similarity corresponds to the highest possible likelihood that the communication items are related to the target communication item. The higher percentage may be any suitable percentage, such as 30%, 40%, 50%, 60%, 70%, 80%, 90%, or any percentage value in between, lower, or higher. As a result, the related communication item determiner 272 determines the communication items that have the highest relatedness to the target communication item.

In one example, suppose the percentage of similarity is lower than the higher percentage of similarity (for example, lower than the first threshold, but higher than a second threshold). In response to determining that the percentage of similarity is below the first threshold but higher than a second threshold, certain embodiments of the related communication item determiner 272 classify the respective communication item as potentially being related. In one embodiment, based on the degree of similarity being between the first and second thresholds, the related communication item determiner 272 classifies the communication item as a candidate-related communication item to be used only if a threshold number of related communication items (that have data features exceeding the first threshold) are not determined.

In another example, suppose the percentage of similarity is lower than the second threshold. In this example, based on the percentage of similarity being lower than the second threshold, the related communication item determiner 272 determines the corresponding communication item to not be related. As a result, in this example, the related communication item determiner 272 does not classify the corresponding communication item as related. Although these examples are discussed in the context of two thresholds, these embodiments are applicable to any number of thresholds or no thresholds. Additionally, although this example is discussed in the context of the related communication item determiner 272 determining a degree of similarity, in some embodiments, the related communication item determiner 272 automatically determines a corresponding communication item as being related to the target communication item in response to detecting any particular phrase, topic, entity, or the like.

In some embodiments, related communication items determined by related communication item determiner 272 have a corresponding relevance weight. Accordingly, embodiments of related communication item determiner 272 are configured to use the corresponding relevance weight of the respective related communication item to rank, prioritize, or filter specific related communication items. Related communication items that have a relevance weight indicating greater relevance to the target communication item or user (for example, a higher weight) are more likely to be used to extract data features used to generate the contextual title for the target communication item. Further, as described herein, relevance can be determined based on user-communication data, which indicates a user context or intent. Therefore, in some embodiments, related communication items are determined based on the user context or intent. In this way, related communication items may be contextualized for the user.

In some embodiment, the related communication item determiner 272 determines the related communication based on a comparison of a topic of the plurality of communication items to an entity or topic of the target communication item for which a title is being generated. For example, the related communication item determiner 272 accesses the entity for the target communication item as determined by entity determiner 262. Thereafter, certain embodiments of the related communication item determiner 272 determines a topic for the communication item. In one example, the topic for the communication item is determined based on the contextual title of the communication item if the communication item has a contextual title.

In instances where the communication item does not include a contextual title, the topic may be determined based on the content of the communication item. Certain embodiment of the related communication item determiner 272 determine a topic for the communication items based on any suitable topic determination method, such as a large language model (for example, Chat GPT-4), topic extraction NLP, or topic modeling, to name a few. For example, the related communication item determiner employs language logic 232 to apply a large language model to determine a topic of a transcript associated with the communication item. For example, suppose a communication item that is within temporal proximity to the target communication item does not include a contextual title. In this example, the related communication item determiner 272 determines a topic of the communication item based on the language logic 232, for example, because the communication item does not include a contextual title.

In some embodiments, after the topic for the communication items are determined, the topic of the communication items are compared against an entity of a topic of the target communication items. In one embodiment, relevance to the target communication item is based on the comparison. For example, the related communication item determiner 272 performs a semantic similarity comparison, a correlation analysis, or any suitable calculation between the topics of the communication item and an entity (or topic) of the target communication item. In this example, the top threshold number of communication items having the highest level of similarity to the target communication item, based on the comparison, are identified as the related communication items.

Some embodiments of related communication item determiner 272 are configured to filter certain related communication items or user-communication data so that only certain related communication items are stored as communication item data 280 used to generate the contextual title. For example, some related communication items are filtered such that only those having greater relevance, as indicated by a determination of relevance (for example, a relevance weight) of the related communication items are stored as communication item data 280. According to one embodiment, the related communication item determiner 272 determines a number of the most related communication items (for example, those having the highest relevance weight), such as the top two, three, four, five, ten, and so forth, of the most related communication items. In some instances, if fewer communication items exist, then the window of time can be expanded to increase the number of the plurality of communication items that are within temporal proximity to the target communication item. Thus, the window of time can be dynamically variable, for example, based on a minimum quantity of related communication items, among any of the determinations discussed herein.

Figures 3A, 3B:
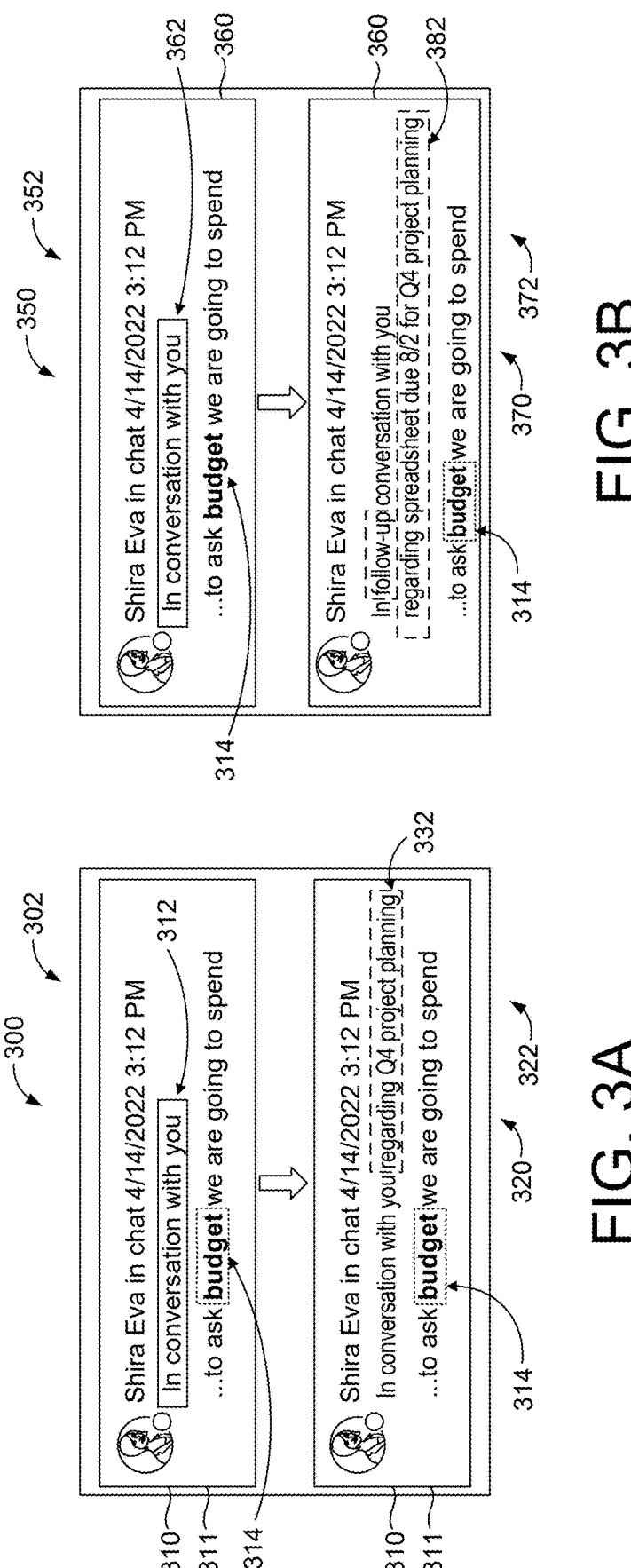
FIG. 3A illustratively depicts an example schematic screenshot from a personal computing device showing aspects of an example graphical user interface that presents a communication item that includes a contextual title for a first user, in accordance with an embodiment of the present disclosure.
FIG. 3B illustratively depicts an example schematic screenshot from a personal computing device showing aspects of an example graphical user interface that presents a communication item that includes a contextual title for a second user, in accordance with an embodiment of the present disclosure.

Continuing with the contextual title generator 270, in some embodiments, the contextual title generator 270 generates the contextual title for the target communication item based at least on the set of related communication items, the target communication item, and the entity. In one embodiment, the contextual title generator 270 accesses the related communication items and generates a contextual title that relates the target communication item to the related communication items. For example, suppose that related communication items have a title "Shira Eva in chat in conversation with you regarding Q4 project planning." In this example, the contextual title generator 270 accesses the title of the related communication item and generates a contextual title (for the target communication item) that distinguishes from this contextual title of the related communication item, yet acknowledges the relatedness. In one example, the contextual title for the target communication item is generated in response to a user search for a particular entity, which in this example, can be "Budget." In this example, the contextual title for the communication item includes a "Shira Eva in chat in conversation with you, in a second conversation, regarding details for spreadsheet due for Q4 project planning." In this manner, the contextual title for the target communications item includes a dependency indication (in this example "second conversation, regarding . . . Q4 planning project") and a unique portion (in this example, "regarding details for spreadsheet due") to differentiate from the contextual title of the related communication item. FIGS. 3A and 3B show these two communication items.

In the aforementioned example, the contextual title generator 270 generates a contextual title for a target communication item based on a contextual title of related communication items, but in some embodiments, the contextual title is generated based on unrelated communication items. In one embodiment, the contextual title generator 270 generates the contextual title so as to distinguish it from unrelated communication items. For example, the communication items of the plurality of communication items that were not identified as related can be used to validate the contextual title to ensure that the contextual title for the target communication item is differentiated from a topic of contextual title of the unrelated communication items. In some embodiments, the validation of the contextual title is based on a semantic analysis comparing the entities in the contextual title to those of a topic or contextual title of the unrelated communication items. In one example, a large language model is employed to generate the contextual title of the target communication item.

In one embodiment, the contextual title generator 270 generates a contextual title during times of non-peak hours for communication items that have been saved, for example, as communication item data 280 in storage 225. For example, the contextual title generator 270 determines from communication data collection component 210 that non-peak hours, during which low computational load is experienced by a server, occurs overnight. In this example, the contextual title generator 270 generates the contextual titles overnight for communication items saved since the previous time the contextual titles were generated (for example, the night before). Alternatively or additionally, in some embodiments, the contextual title is generated in response to a user input, such as a search for a particular item submit by the user. For example, in FIGS. 4A, 4B, and 4C, various users search for "budget." In these examples, the contextual title may be generated in response to receiving the search.

In some embodiments, the contextual title generator 270 resolves scenarios likely to result in redundant information and unnecessary memory storage usage so that the utility of the contextual title is assessed and the contextual title stored if the contextual title adds context to the target communication item. In one embodiment, the contextual title generator 270 analyzes a contextual title of a target communication item to verify that the contextual title provides additional context to the target communication item. In this example, the contextual title is compared to an entity occurring within the communication to determine if the entity also appears in the contextual title; if the entity does not indicate the contextual title, then the contextual title is verified and saved.

Additionally, in some embodiments, the contextual title generator 270 determines and remedies scenarios likely to cause an error in the contextual title so that the accuracy of the generated contextual title is increased. In one embodiment, the accuracy of the contextual title is assessed by checking whether words in the contextual title appear in the set of related communication items or in the target communication item. Additionally, a coherence of certain generated contextual titles is determined, for example, through a semantic analysis of the contextual title. After the contextual title has been verified and checked for errors, the contextual title can be saved to storage 225, for example.

The metadata manager 274, in general, is responsible for modifying or adding metadata indicative of the contextual title determined by the contextual title generator 270 to a metadata field associated with the target communication item. In some embodiments, the metadata manager 274 generates a new metadata field and assigns the alphanumeric characters of the contextual title to the new metadata field. As set forth above and shown in example FIG. 3B, suppose the contextual title is determined to be "Shira Eva in chat conversation with you, in a second conversation, regarding details for spreadsheet due for Q4 project planning." In this example, the text "in a second conversation, regarding details for spreadsheet due for Q4 project planning" is appended to the end of the preset title (in this example, "Shira Eva in chat conversation") of the communication item. In this example, this text (in this example, "in a second conversation, regarding details for spreadsheet due for Q4 project planning") is saved to the new metadata field.

In another embodiment, the metadata manager 274 removes a portion of the preset title, and adds the contextual title. In this example, suppose a communication item has a preset title of "Shira Eva in chat conversation with you" and a contextual title is determined to be "in a second conversation, regarding details for spreadsheet due for Q4 project planning." In this example, a portion of the text of the present title, such as "in chat conversation with you" is removed and the contextual title is added to generate a processed contextual title that includes: "Shira Eva, in a second conversation, regarding details for spreadsheet due for Q4 project planning."

It should be understood that in some embodiments, the entire contextual title is added to the new metadata field. Moreover, although this example is discussed in the context of adding a new metadata field, it should be understood that in some embodiments, an existing metadata field indicative of the title of the target communication item is modified to include the determined contextual title. In this manner, certain embodiments generate a contextual title that is saved as metadata to improve the efficiency of search and storage, that is relevant to a user (for example, personalized to the user), and that is easy for the user to consume.

Continuing with FIG. 2, example system 200 includes one or more end-user application(s) 290, which comprise computer applications or services that provide improved user computing experiences, for example, to facilitate consumption, by an end-user, of aspects of the embodiments disclosed herein. Examples of end-user application(s) 290 include, without limitation, content personalization services, user intent inference services, automatic speech recognition services, device power management services, and semantic understanding services.

In particular, a first example end-user application(s) 290 comprises content personalization services. In one embodiment, a content personalization engine 291 is provided to facilitate the provision of a personalized user experience. Thus, content personalization engine 291 is one example of an application or service (or set of applications or services) that consumes a contextual title to provide personalized meeting content to a user, as determined by implementations of the present disclosure.

At a high level, example content personalization engine 291 is responsible for generating and providing aspects of personalized user experiences, such as personalized content or tailored delivery of target communication items that have been enriched with the contextual title, to a user. In some embodiments, the target communication item with the contextual title is provided as part of an application programming interface (API) where it is consumed by yet another application or service. In one example of providing personalized content, where a user's calendar (or other user data such as email) indicates that a user has an exam, the user is automatically provided with communication items that include the contextual title (in this example, with information relevant to the exam), as discussed herein. In one embodiment, the lecture recordings provided for courses that the user is currently signed up for and the contextual title for these lecture recordings are determined based on user activity pattern information, which includes the user's browsing habits during final exam months.

In some embodiments, content personalization engine 291 tailors content for a user to provide a personalized user experience. For example, content personalization engine 291 generates a personalized graphical user interface to be presented to a user, which is provided to presentation component 220, such as those depicted in FIGS. 4A, 4B, and 4C. For example, if user-communication data indicates the user will be presenting to the board soon, when the user searches for a particular entity, such as "budget," the surfaced search results will identify contextual titles associated with the presentation to the board (for example, as show in FIG. 4A). In some embodiments, the GUI is generated in a pop-up window format, thus personalizing it to the context of the user. In some embodiments, other services or applications operating in conjunction with presentation component 220 determine or facilitate when and how to present personalized content. For example, the personalized content is stored in the user profile 240 or the communication item data 280.

Example system 200 of FIG. 2 also includes storage 225. Storage 225 generally stores information including data, computer instructions (for example, software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or in the cloud.

As shown in example system 200, storage 225 includes communication context logic 230, language logic 232, and contextual title logic 235, as described previously. Storage 225 also includes an example embodiment of a user profile 240 and communication item data 280. Example user profile 240 includes information about user accounts and devices 242, user-communication data 244, and user configurations/settings 246. In some embodiments, the information stored in user profile 240 is available to other components of example system 200.

User accounts and devices 242 generally include information about user devices accessed, used, or otherwise associated with a user, and/or information related to user accounts associated with the user, which may be used for accessing or collecting user data for a user. For example, information of user accounts and devices 242 comprises at least one of: online or cloud-based accounts (for example, email or social media) such as a Microsoft® MSA account or a Microsoft® 365 account; other accounts such as entertainment or gaming-related accounts (for example, Xbox®, Netflix®, online game subscription accounts, or similar account information); people data that relates to such accounts, such as user emails, texts, instant messages, calls, other communications, and other content; social network accounts and data, such as news feeds; online activity; and calendars, appointments, application data, other user accounts, or the like. Some embodiments of user accounts and devices 242 store information across one or more databases, knowledge graphs, or data structures. As described previously, the information stored in user accounts and devices 242 may be determined from communication data collection component 210 or user activity monitor 250 (including one or more of its subcomponents).

As described previously, user-communication data 244 generally includes information about a user and their corresponding communication items, which may be associated with the user profile 240. In one embodiment, user-communication data 244 includes user data received from communication data collection component 210 or user data determined by user activity monitor 250 (or its subcomponents), which includes user-related activity data, a context or contextual information, and user data features (or structured or semi-structured user data), in some embodiments. User-communication data 244 also may include information regarding communication items, such as a transcript of spoken content delivered during the meeting, a chat transcript of messages exchanged privately or publicly during the meeting, and other examples discussed herein and the like. Example user-communication data 244 also includes information regarding the user's interactions with one or more communication items, such as the number of interactions, frequency, or other data regarding the interactions the user had during the meeting that are relevant to the user.

User configurations/settings 246 generally include user settings or preferences associated with embodiments described herein. By way of example and not limitation, such settings include user configurations or preferences about the various thresholds described herein, confidence values associated with inferences, explicitly defined settings regarding user data used to determine a contextual title, preferences regarding contextual titles that are provided to the user, preferences or configurations regarding the presentation of the communication items having contextual titles by computing applications and services used by the user, or other preferences or configuration settings for any of the embodiments described herein.

Example communication item data 280, in general, comprises information about the related communication items, the plurality of communication items, the target communication items, the contextual titles or any information determined by the communication context determiner 260 and the contextual title generator 270, as well as any suitable data helpful in generating the interfaces of FIGS. 3A, 3B, 4A, 4B, 4C, and 5. In one embodiment, the presentation component 220 receives the communication item data 280 to generate the interfaces of FIGS. 3A, 3B, 4A, 4B, 4C, and 5. For example, the communication item data 280 includes contextual titles, entities, and corresponding topics associated with communication items.

Example system 200 includes a presentation component 220 that is generally responsible for presenting content including the communication items and their corresponding contextual titles, such as the information determined by the communication context determiner 260 and the contextual titles determined by contextual title generator 270. Certain content is presented via one or more presentation components 916, as described in FIG. 9. Example presentation component 220 comprises one or more applications or services on a user device across multiple user devices or in the cloud. In one embodiment, presentation component 220 manages the presentation of communication items with user-specific contextual titles to users across multiple user devices, such as a mobile device, laptop device, or virtual reality (VR) headset, and so forth. For example, presentation component 220 determines on which user device(s) content is presented and/or how much content is presented, presents the communication items with their corresponding contextual titles generated by the contextual title generator 270, presents the communication item data 280, and/or presents any data associated with any other components of system 200. Embodiments of presentation component 220 present communication item data 280, including any substitutions, reorganizations, or highlights as directed by presentation logic or by contextual title generator 270.

Some embodiments of presentation component 220 can determine how many communication items should be presented to a user. Alternatively, presentation logic may specify for presentation component 220, or any component of system 200 may instruct presentation component 220 how many communication items, if any, should be presented to a user. This determination can be made, for example, based upon the user device's screen size (with potentially more or differently formatted communication items presentable on, for instance, a laptop computer, as compared to a mobile phone) or the surface on which the communication items will be presented (for example, a calendaring application, communication platform, or other application or program).

Embodiments of the presentation component 220 present, via a graphical user interface ("GUI"), in a number of different formats and applications, such as those shown in FIGS. 3A, 3B, 4A, 4B, 4C, and 5 (discussed further below). In one embodiment, presentation component 220 generates user interface elements associated with or used to facilitate presenting a listing of communication items in response to a search or user prompt (such as shown in connection with FIGS. 4A, 4B, and 4C). Such elements can include icons or indicators, graphics buttons, sliders, menus, audio prompts, alerts, alarms, vibrations, pop-up windows, notification bar or status bar items, in-app notifications, queries, prompts, or other similar features for interfacing with a user.

With reference now to FIGS. 3A, 3B, 4A, 4B, 4C, and 5, a number of example schematic screenshots from a personal computing device are illustratively depicted, showing aspects of example graphical user interfaces (GUIs) that include presentation of aspects of the embodiments described herein. The example contextual titles shown in FIGS. 3A, 3B, 4A, 4B, 4C, and 5 are determined for a particular user and contextualized for a user, such as described in connection with the components of system 200 of FIG. 2.

With reference now to FIGS. 3A and 3B, a number of example schematic screenshots from a personal computing device are illustratively depicted, showing aspects of example graphical user interfaces (GUIs) that include how an initial version 310 of a target communication item 311 with a generic title 312 is modified to include a contextual title, as described herein. The example contextual titles shown in FIGS. 3A and 3B are determined for respective users and contextualized for those respective users, such as described in connection with the components of system 200 of FIG. 2. As such, the contextual title generated in FIG. 3A is specific for a first user, while the contextual title generated in FIG. 3B is specific to another user. The example contextual titles are generated by the contextual title generator 270 of FIG. 2 based on the other components of system 200 of FIG. 2. In these examples, the respective users search for an entity "budget," and a particular communication item is surfaced.

Turning to FIG. 3A, two example schematic screen displays 300 and 320 are shown, which represents a computing device, such as user device 102*n*, discussed above with respect to FIG. 1. Screen displays 300 and 320 are shown having a graphical user interface (GUI) 302 and 322, respectively, which could be produced on computing device screen display 300 and 320 by any number of different computer programs, applications or other displays discussed herein. As illustrated, the GUI 302 includes an initial version of a target communication item 310 with a generic title 312 and can be generated in response to a user search for the entity 314 indicative of the word "budget." The generic title 312 fails to include contextual information that is meaningful to the user. By employing aspects of this disclosure, a contextual title 332 can be generated for the same target communication item 310. In one example, the GUI 322 is similarly generated in response to a user search for the entity 314 indicative of the word "budget." Whereas the generic title 312 of the initial target communication item 310 includes a title "in conversation with you," the contextual title of the updated target communication item 310 includes a title: "in conversation with you regarding Q4 project planning." In this manner, the target communication item can include information meaningful to a user to facilitate identifying information and distinguishing between various results surfaced in response to searching for entity: "budget."

Turning to FIG. 3B, two example schematic screen displays 350 and 370 are shown, which represents a computing device, such as user device 102*n*, discussed above with respect to FIG. 1. Screen displays 350 and 370 are shown having a graphical user interface (GUI) 352 and 372, respectively, which could be produced on computing device screen display 350 and 370 by any number of different computer programs, applications or other displays discussed herein. As illustrated, the GUI 352 includes an initial version of a target communication item 360 with a generic title 362 and can be generated in response to a user search for the entity 314 indicative of the word "budget." The generic title 362 fails to include contextual information that is meaningful to the user. By employing aspects of this disclosure, a contextual title 382 can be generated for the same target communication item 360. In one example, the GUI 372 is similarly generated in response to a user search for the entity 314 indicative of the word "budget."

Whereas the generic title 362 of the initial target communication item 360 includes a title "in conversation with you," the contextual title of the updated target communication item 360 includes a title: "in follow-up conversation with you regarding details for spreadsheet due for Q4 project planning." In this example, the context added to the title is shown in a box having dashed lines and includes clarification that the communication item is a (1) follow up communication item and (2) is about a spreadsheet due Aug. 2, 2022 by the user for Q4 project planning. The contextual title 382 can include an excerpt of text from the corresponding transcript of the contextual item or a summary of content included in the communication item. In this manner, the target communication item can include information meaningful to a user to facilitate identifying information and distinguishing between various results surfaced in response to searching for entity: "budget." In one embodiment, the communication item 360 is provided by a productivity application, such as an electronic calendar to create a digital record indicative of a reminder or deadline event dated Aug. 2, 2022. The contextual title 382 in FIG. 3B is different from the contextual title 332 of FIG. 3A because the users are different. In this manner, the contextual title is specific to a user despite concerning the same target communication item.

Turning to FIGS. 4A, 4B, and 4C, depicted are example schematic screenshots 400, 420, and 440 from a personal computing device of three separate users who participated in a same meeting. Example schematic screenshots 400, 420, and 440 show aspects of respective example graphical user interfaces 402, 422, and 442 that present a plurality of communication items. In FIGS. 4A, 4B, and 4C, respective users submit a similar query for an entity "budget." In response to the search and consistent with the embodiments disclosed herein, target communication items are surfaced with corresponding contextual titles that can be different for different users despite the contextual titles referencing the same communication item, which in these three examples corresponds to a call between Dikla, Tzoof, and Eyal. First, in FIG. 4A, the top search result is a particular target communication item 406 modified by Dikla on May 10, 2023 and which has a contextual title that is specific to the first user, which in this case is Dikla. In this example, the contextual title includes "Conversation between you, Eyal, and Tzoof regarding details for your Q4 presentation to the board . . . ."

Second, in FIG. 4B, the search result that is surfaced is the particular target communication item 406 modified by Dikla on May 10, 2023 and that has a contextual title that is specific to the second user, which in this case is Tzoof. In this example, the contextual title includes "Conversation between you, Eyal, and Dikla regarding details for Q4 report to help you prepare for your Q2 report due Jul. 3, 2023."

Third, in FIG. 4C, the search result that is surfaced is the particular target communication item 406 modified by Dikla on May 10, 2023 and that has a contextual title that is specific to the third user, which in this case is Eyal. In this example, the contextual title includes "Conversation between you, Tzoof, and Dikla regarding the training seminar on how to leverage SQL databases for budget planning . . . ."

Additionally, in some embodiments, the order in which the target communication item is listed varies across the GUI of the respective users based on the relevance of the communication items to the user, which can be based on relevance of the contextual title to the user and the search for the entity. For example, in FIG. 4A, the target communication item 406 is the top result because it is the most related over the other communication items 408. On the other hand, in FIG. 4B, the target communication item 406 is the second result because it is the second most related compared to the other communication items 428. In FIG. 4C, the target communication item 406 is the third result because it is the third most related compared to the other communication items 448.

Figure 5:
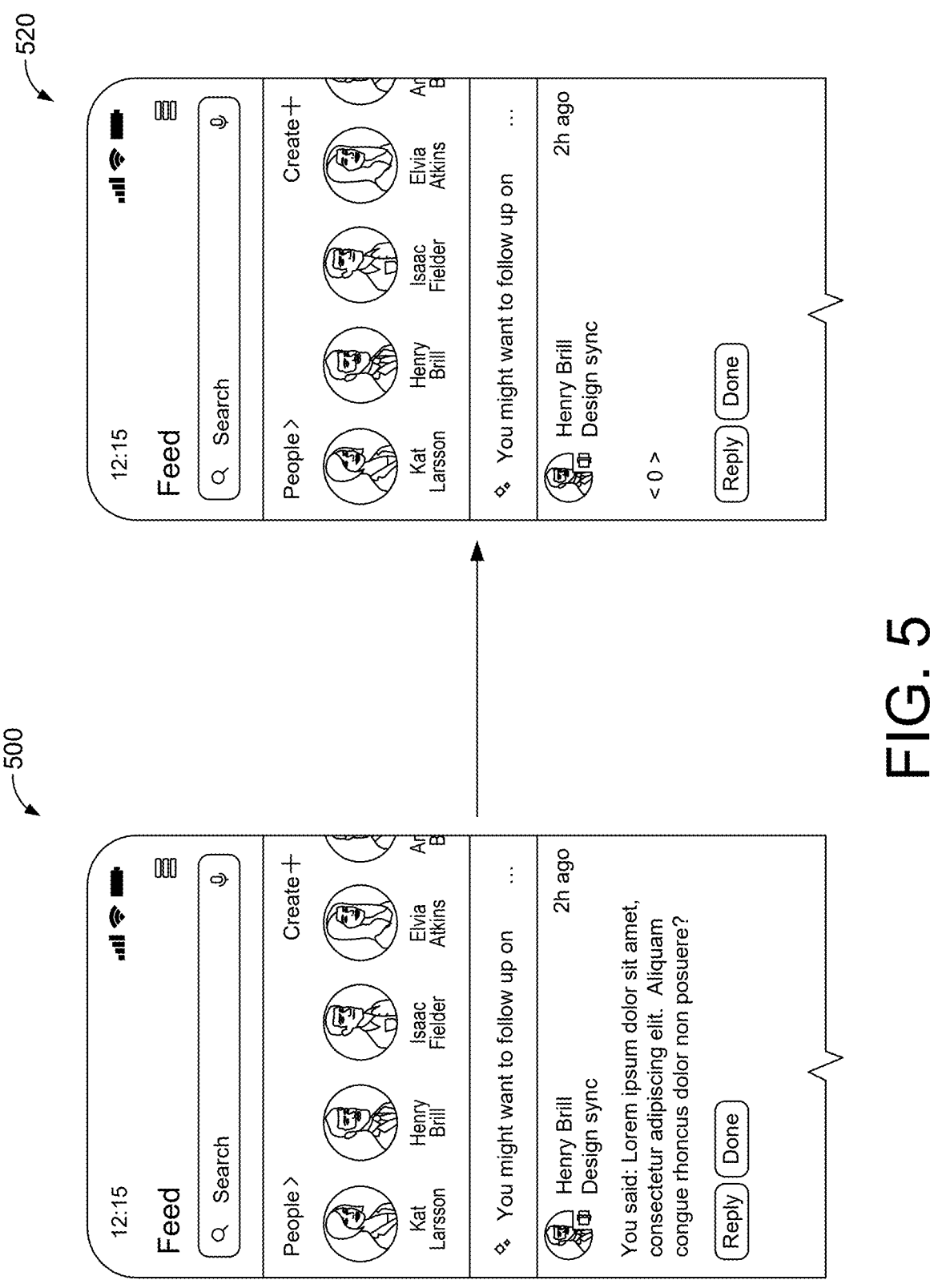
FIG. 5 illustratively depicts an example schematic screenshot from a personal computing device showing aspects of an example graphical user interface that presents content in a different language, in accordance with an embodiment of the present disclosure.

Turning to FIG. 5, depicted is an example schematic screenshot 500 from a personal computing device showing aspects of an example graphical user interface that includes content, such as a communication item, in a different language, in accordance with an embodiment of the present disclosure. In this example, the language of the communication item deviates from that defined in the user's settings defined in user profile 240. As a result, the text in the foreign language is assigned a default character string to facilitate computations in determining a contextual title for another communication item. In this example, the default character string is "<0>."

Embodiments of the multi-modal language handler 266 of FIG. 2 employ language logic 232 of FIG. 2 to identify and characterize a string of text in a foreign language based on the characters and meaning of the string of text. In one embodiment, the multi-modal language handler 266 identi-fies text that deviates from a target language or languages that the user has designated in his or her user configurations/settings 246. For example, suppose a user has user configu-rations/settings that indicate the user's language preference is English. Based on this example preference, certain embodiments of multi-modal language handler 266 identify instances of the communication item that are not in English and assign a default character string, such as "<0>" to the identified instances, as shown in the example schematic screenshot 520. In this example, the default characters are not analyzed to determined relatedness between communi-cation items, thereby reducing the quantity of data used to determine related communication items by related commu-nication item determiner 272.

Figure 8:
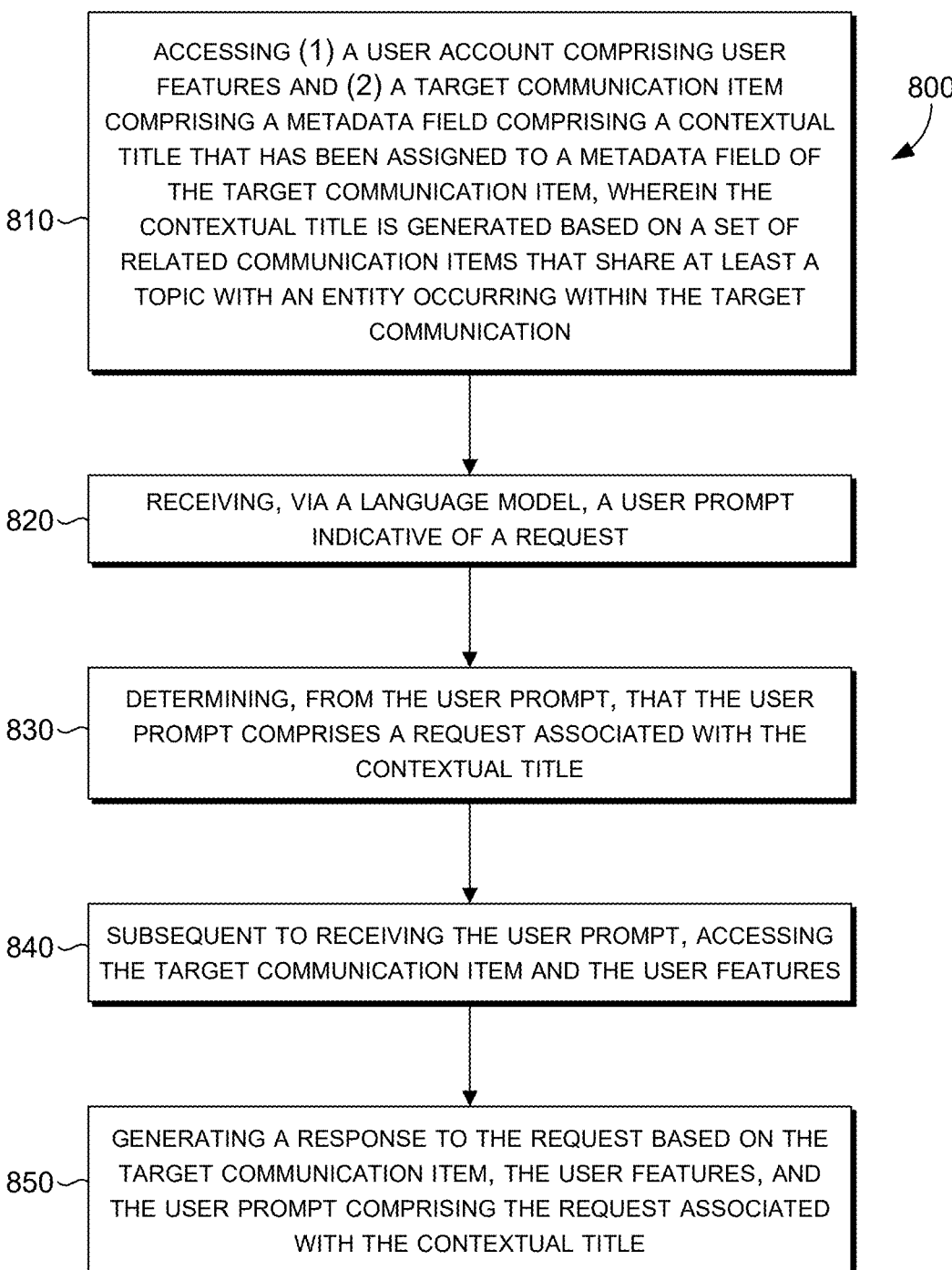
FIG. 8 depicts a flow diagram of a method for generating a response to the request based on the target communication item, the user features, and the user prompt comprising the request associated with the contextual title, in accordance with an embodiment of the present disclosure.

Turning now to FIGS. 6, 7, and 8, aspects of example process flows 600, 700, and 800 are illustratively depicted for some embodiments of the disclosure. Embodiments of process flows 600, 700, and 800 each comprise a method (sometimes referred to herein as method 600, 700, and 800) carried out to implement various example embodiments described herein. For instance, at least one of process flow 600, 700, and 800 are performed to programmatically gen-erate, for a target communication item, a contextual title, which is used to provide any of the improved electronic communications technology or enhanced user computing experiences described herein.

Each block or step of process flow 600, process flow 700, process flow 800, and other methods described herein com-prises a computing process performed using any combina-tion of hardware, firmware, and/or software. For instance, various functions are carried out by a processor executing instructions stored in memory, such as memory 912 as described in FIG. 9 and/or as storage 225 as described in FIG. 2. Embodiments of the methods are also be embodied as computer-usable instructions stored on computer storage media. Embodiments of the methods are provided by a stand-alone application, a service or hosted service (stand-alone or in combination with another hosted service), or a plug-in to another product, to name a few. For example, the blocks of process flow 600, 700, and 800 that correspond to actions (or steps) to be performed (as opposed to informa-tion to be processed or acted on) are carried out by one or more computer applications or services, in some embodi-ments, which operate on one or more user devices (such as user device 102a of FIG. 1), servers (such as server 106 of FIG. 1), and/or are distributed across multiple user devices, and/or servers, or by a distributed computing platform, and/or are implemented in the cloud, such as described in connection with FIG. 10. In some embodiments, the func-tions performed by the blocks or steps of process flows 600, 700, and 800 are carried out by components of system 200, as described in FIG. 2.

With reference to FIG. 6, aspects of example process flow 600 are illustratively provided for generating a processed contextual title for a target communication item. Example contextual titles are illustrated in FIGS. 3A, 3B, 4A, 4B, and 4C.

At block 610, method 600 includes accessing a plurality of communication items and a target communication item of a communication application. In various embodiments, the communication application comprises a collaboration soft-ware application, a messaging software application, a video streaming software application such as a video streaming service, or a meeting streaming application. At block 620, method 600 includes determining that an entity occurs within the target communication item. At block 630, method 600 includes identifying, from the plurality of communication items, a set of related communication items that were timestamped within temporal proximity to the target communication item and that share at least a topic with the entity occurring within the target communication item. At block 640, method 600 includes generating a contextual title for the target communication item based at least on the set of related communication items, the target communication item, and the entity. At block 650, method 600 includes determining, from the contextual title and based on a sensitivity policy, a data instance representing data to be omitted from the contextual title. At block 660, method 600 includes determining representative tokens replacing the data instance from the contextual title. At block 670, method 600 includes generating, from the contextual title, a processed contextual title that comprises the representative tokens replacing the data instance from the contextual title. At block 680, method 600 includes assigning the processed contextual title to a new metadata field associated with the target communication item.

With process flow 600 in mind, in one example, the target communication item includes the meeting recording for which a contextual title is being generated. In one example, the contextual title corresponds to the contextual title generated via the claim for the target communication item. For example, the contextual title can include additional context for a default title of a meeting recording, or can be an entirely new title for the communication item. In one example, the processed contextual title refers to the version of the contextual title that has any sensitivity data removed from the contextual title. In one example, a respective contextual title refers to the contextual title of one of the related communication items.

Take as a non-limiting example an implementation of process flow 600 whereby a target communication item that is a meeting recording saved with a generic title "2023 Jun. 13.MP4." Based on process flow 600, a contextual title, such as "Meeting with boss Joe with reminder to input social security number 555-55-5555 of Jane into database" is generated for this meeting recording. In this example, the processed contextual title includes a version of this title that removes the sensitive information, such as the social security number. In this example, the processed contextual title would be "Meeting with boss Joe with reminder to input social security number of Jane into database." Then, in this example, the processed contextual title or the contextual title is compared against respective contextual titles of other related communication items that relate to the target communication item. In this manner, the uniqueness of the contextual title is determined to ensure that contextual titles of similar names are not generated for the target communication item.

With reference to FIG. 7, aspects of example process flow 700 are illustratively provided for generating a contextual title for a target communication item. Example contextual titles are illustrated in FIGS. 3A, 3B, 4A, 4B, and 4C.

At block 710, method 700 includes accessing user-communication data, a plurality of communication items, and a target communication item. At block 720, method 700 includes extracting, from the user-communication data, a plurality of user features. At block 730, method 700 includes determining, from the plurality of communication items and based at least on the plurality of user features, a set of related communication items comprising at least one related communication item comprising a respective contextual title or having a respective topic. At block 740, method 700 includes generating a contextual title for the target communication item that is different from the respective contextual title or the respective topic, the contextual title being generated based on the target communication item and at least on one of: a user feature of the plurality of user features or the set of related communication items. At block 750, method 700 includes assigning the contextual title to a new metadata field associated with the target communication item.

With reference to FIG. 8, aspects of example process flow 700 are illustratively provided for generating a response to a user request. Example responses to user requests are illustrated in FIGS. 4A, 4B, and 4C.

At block 810, method 800 includes accessing (1) a user account comprising user features and (2) a target communication item comprising a metadata field comprising a contextual title generated based on a set of related communication items that share at least a topic with an entity occurring within the target communication. At block 820, method 800 includes receiving, via a language model, a user prompt indicative of a request. At block 830, method 800 includes determining, from the user prompt, that the user prompt comprises a request associated with the contextual title. At block 840, method 800 includes, subsequent to receiving the user prompt, accessing the target communication item and the user features. At block 850, method 800 includes generating a response to the request based on the target communication item, the user features, and the user prompt comprising the request associated with the contextual title.

OTHER EMBODIMENTS

In some embodiments, a computer system is provided, comprising one or more processors and computer memory having computer-readable instructions embodied thereon, that, when executed by at least one processor of the one or more processors, causes the computer system to perform operations. The operations comprise: accessing a plurality of communication items and a target communication item of a communication application; determining that an entity occurs within the target communication item; identifying, from the plurality of communication items, a set of related communication items that were timestamped within temporal proximity to the target communication item and that share at least a topic with the entity occurring within the target communication item; generating a contextual title for the target communication item based at least on the set of related communication items, the target communication item, and the entity; determining, from the contextual title and based on a sensitivity policy, a data instance representing data to be omitted from the contextual title; determining representative tokens replacing the data instance from the contextual title; generating, from the contextual title, a processed contextual title that comprises the representative tokens replacing the data instance from the contextual title; and assigning the processed contextual title to a new metadata field associated with the target communication item.

In any combination of the above embodiments of the computer system, at least one related communication item of the set of related communication items comprises a respective contextual title. The operations further comprise verifying that the processed contextual title of the target communication item or the contextual title of the target communication item is different from the respective contextual title of the at least one related communication item. The processed contextual title is assigned to the new metadata field in response to the verification.

In any combination of the above embodiments of the computer system, the operations further comprise: determining, using a natural language processing (NLP) model, that a respective communication item of the plurality of communication items comprises an audio transcript comprising multi-language content; and based on the determination that the respective communication item comprises multi-language content, assigning a default character string to the respective communication item instead of determining a topic for the respective communication item. Identifying the set of related communication items that share at least the topic with the entity occurring within the target communication item comprises comparing the default character string to the entity occurring within the target communication item.

In any combination of the above embodiments of the computer system, identifying the set of related communication items comprises: accessing a respective contextual title of at least two communication items of the plurality of communication items; determining a level of relatedness between the respective contextual title and the target communication item based on a semantic analysis between the respective contextual title and the target communication item; and ranking the at least two communication items based on the semantic analysis, wherein the at least two communication items satisfy a threshold level of relatedness and are included in the set of related communication items.

In any combination of the above embodiments of the computer system, the entity comprises at least one of a task, a commitment, a request, a deadline, a project, or a user identity.

In any combination of the above embodiments of the computer system, the target communication item and the plurality of related communication items each comprise at least one of a message transcript, a chat message that does not include a subject line, a video transcript, an SMS text thread, or a photo.

In any combination of the above embodiments of the computer system, determining that the set of related communication items share the topic comprises: determining, based at least on metadata associated with the plurality of communication items, at least one topic of each communication item of the plurality of communication items; determining, based at least on metadata associated with the target communication item, at least one topic of the target communication item; comparing the at least one topic of each communication item of the plurality of communication items and the at least one topic of the target communication item; and determining, based on the comparison, a level of relatedness between the at least one topic of each communication item of the plurality of communication items and the at least one topic of the target communication item. The set of related communication items comprise a threshold quantity of communication items of the plurality of communication items that share a topic and that have a highest or lowest level of relatedness between the topic.

In any combination of the above embodiments of the computer system, the new metadata field associated with the target communication item is used by a productivity application to cause a graphical user interface to be generated, listing the target communication item with the processed contextual title.

In any combination of the above embodiments of the computer system, the set of related communication items are within at least one of a threshold quantity of communication items; or a window of time defined as having a start time and end time between which a time stamp associated with the target communication item occurs.

In any combination of the above embodiments of the computer system, the communication application comprises a video streaming service, and wherein the sensitivity policy comprises at least one of a corporate, organizational, enterprise, state, or federal sensitivity policy defining management of information within the video streaming service.

In some embodiments, computer-implemented method is provided and comprises: accessing user-communication data, a plurality of communication items, and a target communication item; extracting, from the user-communication data, a user feature; determining, from the plurality of communication items and based at least on the user feature, a set of related communication items comprising at least one related communication item having a respective contextual title or a respective topic; generating a contextual title for the target communication item that is different from the respective contextual title or the respective topic, the contextual title being generated based on the target communication item and at least on one of: the user feature or the set of related communication items; and assigning the contextual title to a new metadata field associated with the target communication item.

In any combination of the above embodiments of the computer-implemented method, the computer-implemented method further includes determining, from the contextual title and based on a sensitivity policy, a data instance representing data to be omitted from the contextual title; determining representative tokens replacing the data instance from the contextual title; and generating, from the contextual title, a processed contextual title that comprises the representative tokens replacing the data instance from the contextual title, the processed contextual title replacing the contextual title in the new metadata field.

In any combination of the above embodiments of the computer-implemented method, determining the set of related communication items comprises determining that an entity occurs within the target communication item, wherein the set of related communication items were timestamped within temporal proximity to the target communication item and share at least a topic with the entity occurring within the target communication item.

In any combination of the above embodiments of the computer-implemented method, the computer-implemented method further includes determining, from the plurality of communication items and based at least on the user feature, a set of unrelated communication items comprising at least one unrelated communication item of the set of unrelated communication items that comprises a respective unrelated contextual title or that has a respective unrelated topic. The contextual title being generated based on the set of unrelated communication items. The contextual title is distinct from the unrelated contextual title and does not share the unrelated topic.

In any combination of the above embodiments of the computer-implemented method, determining the set of related communication items comprises: determining a respective contextual title of at least two communication items of the plurality of communication items; determining a level of relatedness between the respective contextual title and the target communication item based on a semantic analysis between the respective contextual title and the target communication item; and ranking the at least two communication items based on the semantic analysis, wherein the communication items of the at least two communication items that satisfy a threshold level of relatedness is included in the at set of related communication items.

In any combination of the above embodiments of the computer-implemented method, the contextual title is generated in response to an input comprising: (1) the target communication item, (2) the respective item, and (3) the set of related communication items, being provided to a large language model.

In any combination of the above embodiments of the computer-implemented method, the contextual title is generated with a portion of the contextual title that associates the target communication item to at least one related communication item of the set of related communication items based on a corresponding topic or a corresponding contextual title of the at least one related communication item of the set of related communication items.

In some embodiments, a computer storage media is provided and has computer-executable instructions embodied thereon, that, when executed by at least one computer processor, cause computing operations to be performed. The operations comprise accessing a user account comprising user features and a target communication item comprising a metadata field comprising a contextual title generated based on a set of related communication items that share at least a topic with an entity occurring within the target communication; receiving, via a language model, a user prompt indicative of a request; determining, from the user prompt, that the user prompt comprises a request associated with the contextual title; subsequent to receiving the user prompt, accessing the target communication item and the user features; and generating a response to the request based on the target communication item, the user features, and the user prompt comprising the request associated with the contextual title.

In any combination of the above embodiments of the computer storage media, the language model comprises a large language model.

In any combination of the above embodiments of the computer storage media, the contextual title is generated by: determining, from a plurality of communication items and based at least on the user features, a set of related communication items comprising at least one related communication item comprising a respective contextual title or a respective topic; and generating the contextual title for the target communication item that is different from the respective contextual title or the respective topic, the contextual title being generated based on the target communication item and at least on one of: a user feature of the user features or the set of related communication items.

Example Computing Environments

Figure 9:
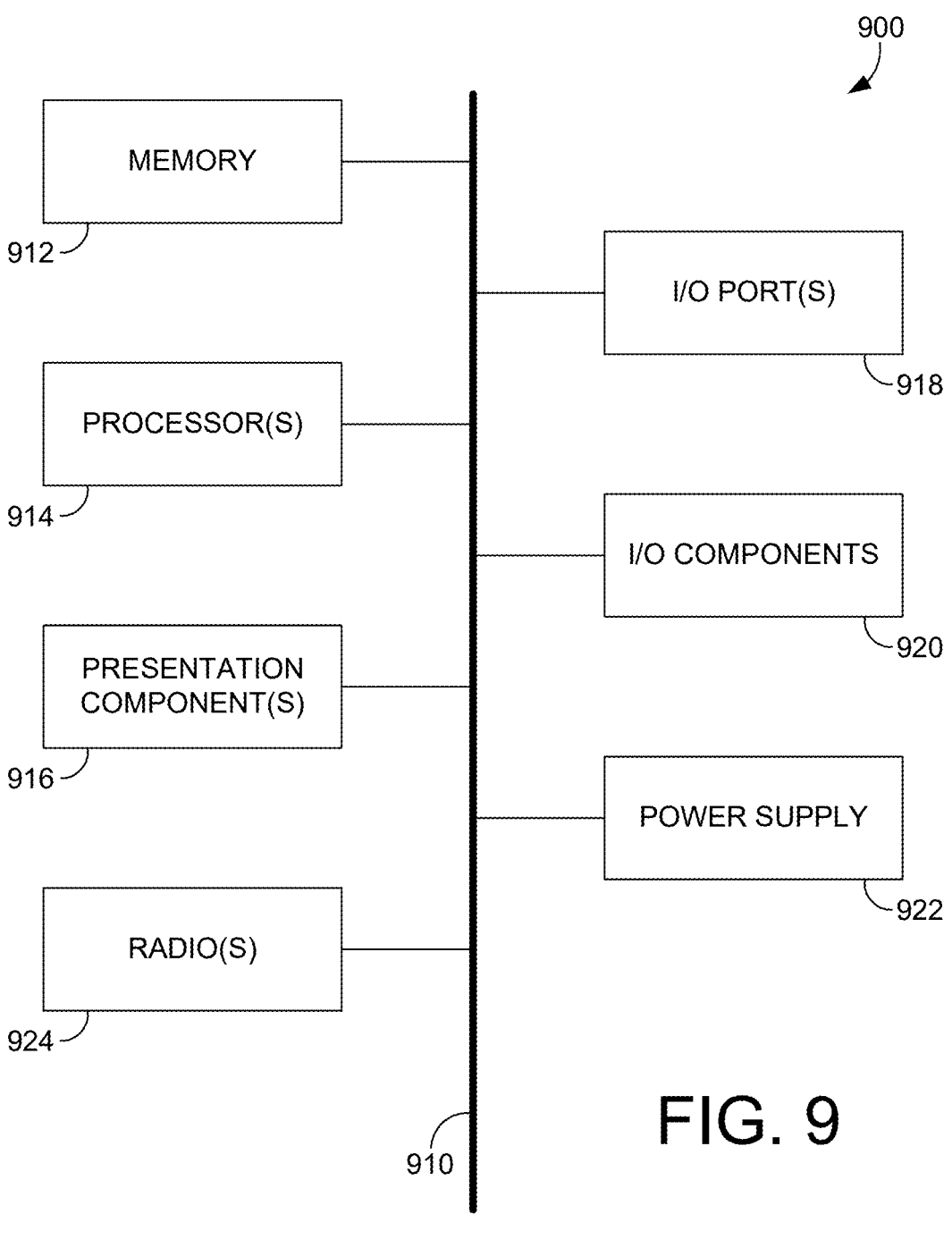
FIG. 9 is a block diagram of an example computing environment suitable for use in implementing an embodiment of the present disclosure.
Figure 10:
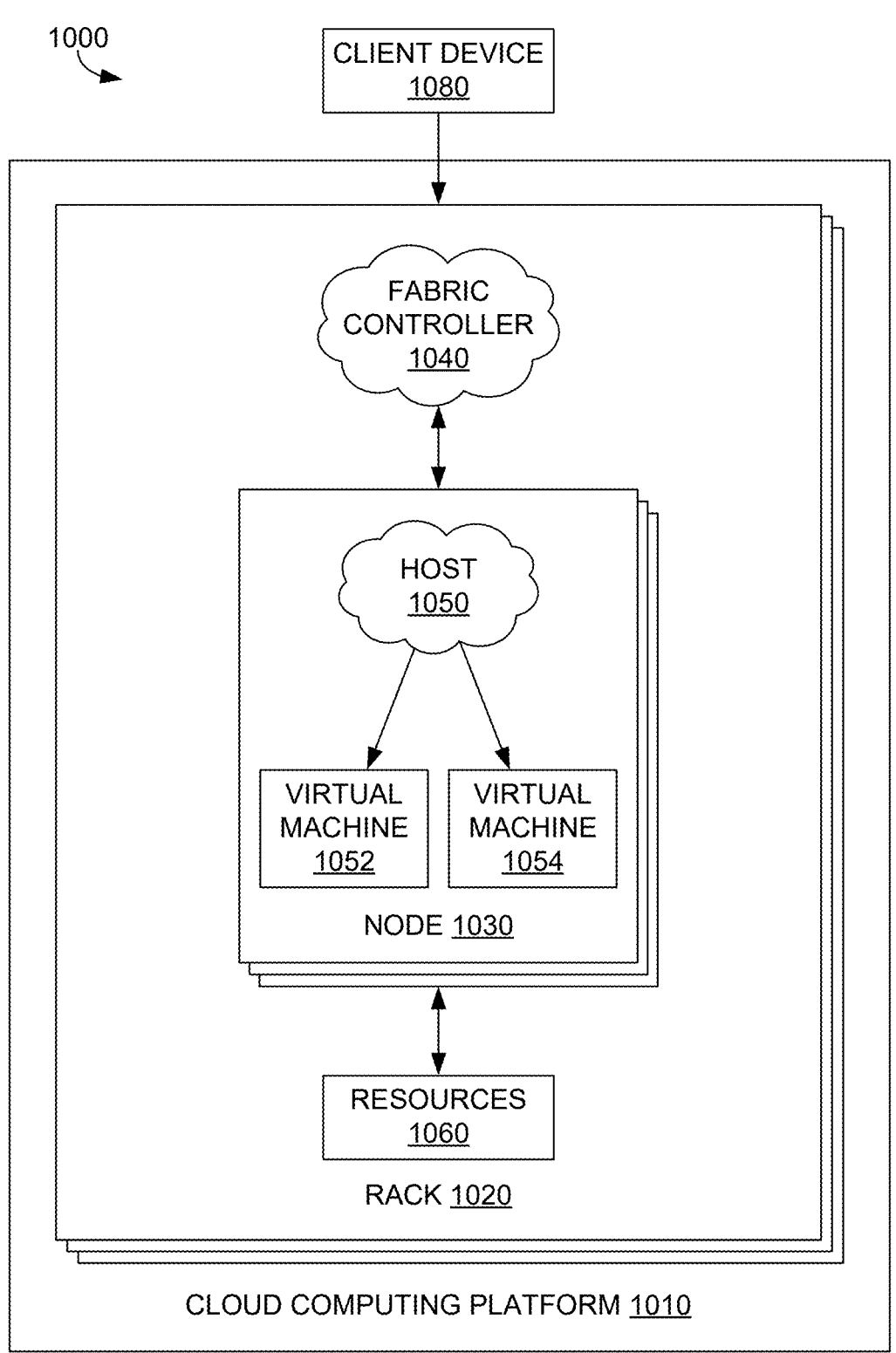
FIG. 10 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 9 and 10, respectively. With reference to FIG. 9, an example computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated with the embodiments of the present disclosure.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. In one example, bus 910 represents one or more buses (such as an address bus, data bus, or combination thereof). Although the various blocks of FIG. 9 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 9 is merely illustrative of an example computing device that can be used in connection with one or more embodiments of the present disclosure. Distinction is not made between such categories as "workstation," "server," "laptop," or "handheld device," as all are contemplated within the scope of FIG. 9 and with reference to "computing device."

Computing device 900 typically includes a variety of computer-readable media. Computer-readable media can be any available media that can be accessed by computing device 900 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 912 includes computer storage media in the form of volatile and/or non-volatile memory. In one example, the memory is removable, non-removable, or a combination thereof. Hardware devices include, for example, solid-state memory, hard drives, and optical-disc drives. Computing device 900 includes one or more processors 914 that read data from various entities such as memory 912 or I/O components 920. As used herein and in one example, the term processor or "a processer" refers to more than one computer processor. For example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor are performed by more than one processor.

Presentation component(s) 916 presents data indications to a user or other device. Presentation components include, for example, a display device, speaker, printing component, vibrating component, and the like.

The I/O ports 918 allow computing device 900 to be logically coupled to other devices, including I/O components 920, some of which are built in. Illustrative components include a microphone, joystick, game pad, satellite dish, scanner, printer, or a wireless device. The I/O components 920 can provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. In one example, the computing device 900 is equipped with depth cameras, such as stereoscopic camera systems, infrared camera systems, red-green-blue (RGB) camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 include one or more radio(s) 924 (or similar wireless communication components). The radio transmits and receives radio or wireless communications. Example computing device 900 is a wireless terminal adapted to receive communications and media over various wireless networks. Computing device 900 may communicate via wireless protocols, such as code division multiple access ("CDMA"), Global System for Mobile ("GSM") communication, or time division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of Code-Division Multiple Access (CDMA), General Packet Radio Service (GPRS), Global System for Mobile Communication (GSM), Time-Division Multiple Access (TDMA), and 802.16 protocols.

Referring now to FIG. 10, an example distributed computing environment 1000 is illustratively provided, in which implementations of the present disclosure can be employed. In particular, FIG. 10 shows a high level architecture of an example cloud computing platform 1010 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1000 that includes cloud computing platform 1010, rack 1020, and node 1030 (for example, computing devices, processing units, or blades) in rack 1020. The technical solution environment can be implemented with cloud computing platform 1010, which runs cloud services across different data centers and geographic regions. Cloud computing platform 1010 can implement the fabric controller 1040 component for provisioning and managing resource allocation, deployment, upgrade, and management of cloud services. Typically, cloud computing platform 1010 acts to store data or run service applications in a distributed manner. Cloud computing platform 1010 in a data center can be configured to host and support operation of endpoints of a particular service application. In one example, the cloud computing platform 1010 is a public cloud, a private cloud, or a dedicated cloud.

Node 1030 can be provisioned with host 1050 (for example, operating system or runtime environment) running a defined software stack on node 1030. Node 1030 can also be configured to perform specialized functionality (for example, computer nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a multi-tenant infrastructure or tenancy. The terms "service application," "application," or "service" are used interchangeably with regards to FIG. 10, and broadly refer to any software, or portions of software, that run on top of, or access storage and computing device locations within, a datacenter.

When more than one separate service application is being supported by nodes 1030, certain nodes 1030 are partitioned into virtual machines (for example, virtual machine 1052 and virtual machine 1054). Physical machines can also concurrently run separate service applications. The virtual machines or physical machines can be configured as individualized computing environments that are supported by resources 1060 (for example, hardware resources and software resources) in cloud computing platform 1010. It is contemplated that resources can be configured for specific service applications. Further, each service application may be divided into functional portions such that each functional portion is able to run on a separate virtual machine. In cloud computing platform 1010, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 1080 is linked to a service application in cloud computing platform 1010. Client device 1080 may be any type of computing device, such as user device 102*n* described with reference to FIG. 1, and the client device 1080 can be configured to issue commands to cloud computing platform 1010. In embodiments, client device 1080 communicates with service applications through a virtual Internet Protocol (IP) and load balancer or other means that direct communication requests to designated endpoints in cloud computing platform 1010. Certain components of cloud computing platform 1010 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment; however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer system, comprising:
   one or more processors; and
   computer memory having computer-readable instructions embodied thereon, that, when executed by at least one processor of the one or more processors, causes the computer system to perform operations comprising:
   accessing a plurality of communication items and a target communication item of a communication application;
   determining that an entity occurs within the target communication item;

identifying, from the plurality of communication items, a set of related communication items that were time-stamped within temporal proximity to the target communication item and that share at least a topic with the entity occurring within the target communication item;
   generating a contextual title for the target communication item based at least on the set of related communication items, the target communication item, and the entity;
   determining, from the contextual title and based on a sensitivity policy, a data instance representing data to be omitted from the contextual title;
   determining representative tokens replacing the data instance from the contextual title;
   generating, from the contextual title, a processed contextual title that comprises the representative tokens replacing the data instance from the contextual title; and
   assigning the processed contextual title to a new metadata field associated with the target communication item.

2. The computer system of claim 1,
   wherein at least one related communication item of the set of related communication items comprises a respective contextual title;
   wherein the operations further comprise verifying that the processed contextual title of the target communication item or the contextual title of the target communication item is different from the respective contextual title of the at least one related communication item; and
   wherein the processed contextual title is assigned to the new metadata field in response to the verification.

3. The computer system of claim 1, wherein the operations further comprise:
   determining, using a natural language processing (NLP) model, that a respective communication item of the plurality of communication items comprises an audio transcript comprising multi-language content; and
   based on the determination that the respective communication item comprises multi-language content, assigning a default character string to the respective communication item, wherein identifying the set of related communication items that share at least the topic with the entity occurring within the target communication item comprises comparing the default character string to the entity occurring within the target communication item.

4. The computer system of claim 1, wherein identifying the set of related communication items comprises:
   accessing a respective contextual title of at least two communication items of the plurality of communication items;
   determining a level of relatedness between the respective contextual title and the target communication item based on a semantic analysis between the respective contextual title and the target communication item; and
   ranking the at least two communication items based on the semantic analysis, wherein the at least two communication items satisfy a threshold level of relatedness and are included in the set of related communication items.

5. The computer system of claim 1, wherein the entity comprises at least one of a task, a commitment, a request, a deadline, a project, or a user identity.

6. The computer system of claim 1, wherein the target communication item and the set of related communication items each comprise at least one of a message transcript, a chat message that does not include a subject line, a video transcript, an SMS text thread, or a photo.

7. The computer system of claim 1, wherein determining that the set of related communication items share the topic comprises:

determining, based at least on metadata associated with the plurality of communication items, at least one topic of each communication item of the plurality of communication items;

determining, based at least on metadata associated with the target communication item, at least one topic of the target communication item;

comparing the at least one topic of each communication item of the plurality of communication items and the at least one topic of the target communication item; and determining, based on the comparison, a level of relatedness between the at least one topic of each communication item of the plurality of communication items and the at least one topic of the target communication item, wherein the set of related communication items comprise a threshold quantity of communication items of the plurality of communication items that share a topic and that have a highest or lowest level of relatedness between the topic.

8. The computer system of claim 1, wherein the new metadata field associated with the target communication item is used by a productivity application to cause a graphical user interface to be generated, listing the target communication item with the processed contextual title.

9. The computer system of claim 1, wherein the set of related communication items are within at least one of:

a threshold quantity of communication items; or a window of time defined as having a start time and end time between which a time stamp associated with the target communication item occurs.

10. The computer system of claim 1, wherein the communication application comprises a video streaming service, and wherein the sensitivity policy comprises at least one of a corporate, organizational, enterprise, state, or federal sensitivity policy defining management of information within the video streaming service.

* * * * *